(12) United States Patent
Imamura

(10) Patent No.: US 8,654,194 B2
(45) Date of Patent: Feb. 18, 2014

(54) DISTANCE MEASURING DEVICE AND METHOD FOR MANUFACTURING SAME

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 13/126,526

(22) PCT Filed: Mar. 3, 2010

(86) PCT No.: PCT/JP2010/001454

§ 371 (c)(1), (2), (4) Date: Apr. 28, 2011

(87) PCT Pub. No.: WO2010/100915

PCT Pub. Date: Sep. 10, 2010

(65) Prior Publication Data

US 2011/0205357 A1 Aug. 25, 2011

(30) Foreign Application Priority Data

Mar. 6, 2009 (JP) ................................. 2009-054096

(51) Int. Cl.
- *H04N 7/18* (2006.01)
- *H04N 5/217* (2011.01)
- *G03B 13/00* (2006.01)
- *G02B 3/00* (2006.01)
- *G03B 17/00* (2006.01)

(52) U.S. Cl.
USPC ........... 348/135; 348/241; 348/348; 359/642; 396/88

(58) Field of Classification Search
USPC .................... 348/135, 241, 348; 396/149, 88; 359/642

See application file for complete search history.

(56) References Cited

U.S. PATENT DOCUMENTS

| | | | |
|---|---|---|---|
| 4,699,493 A | 10/1987 | Koyama et al. | |
| 5,257,062 A | 10/1993 | Moriyama | |

(Continued)

FOREIGN PATENT DOCUMENTS

| | | |
|---|---|---|
| JP | 60-121408 A | 7/1985 |
| JP | 62-069217 A | 3/1987 |
| JP | 05-066345 A | 3/1993 |
| JP | 07-154663 A | 6/1995 |
| JP | 2003-015029 A | 1/2003 |
| JP | 2003-066300 A | 3/2003 |
| JP | 2008-070120 A | 3/2008 |

OTHER PUBLICATIONS

International Search Report for corresponding International Application No. PCT/JP2010/001454 mailed May 18, 2010.
Form PCT/ISA/237 for International Application No. PCT/JP2010/001454 dated May 18, 2010 and partial English translation.

*Primary Examiner* — Dave Czekaj
*Assistant Examiner* — Tsion B Owens
(74) *Attorney, Agent, or Firm* — Renner, Otto, Boisselle & Sklar, LLP

(57) ABSTRACT

A distance measuring apparatus of the present invention is a distance measuring apparatus for determining a distance to an object, comprising: a plurality of optical systems for forming images of the object; and an image capturing section (N) having a plurality of image capturing areas which are associated with the plurality of optical systems on a one-to-one basis, the image capturing section (N) being configured to convert images of the object formed in respective ones of the image capturing areas through the plurality of optical systems to electric signals, the distance to the object being determined based on a parallax between the images of the object formed through the plurality of optical systems, wherein each of the plurality of optical systems includes n lens surfaces (r1, r2), where n is an integer not less than 2, and a direction of a decentration between an $i^{th}$ lens surface (r1) and a $j^{th}$ lens surface (r2) (counting from the object side) is identical among at least one pair of the plurality of optical systems, where i and j are different integers each of which is not less than 1 and not more than n.

13 Claims, 13 Drawing Sheets

(56) References Cited

U.S. PATENT DOCUMENTS

| | | |
|---|---|---|
| 6,977,782 B2 | 12/2005 | Maeda et al. |
| 2005/0248724 A1* | 11/2005 | Jones ............................ 351/177 |
| 2006/0062104 A1* | 3/2006 | Kimura et al. ............. 369/44.23 |
| 2008/0239512 A1* | 10/2008 | Ota et al. ...................... 359/724 |
| 2009/0003816 A1* | 1/2009 | Tochigi ......................... 396/114 |
| 2010/0007956 A1* | 1/2010 | Noguchi ....................... 359/557 |
| 2010/0182484 A1* | 7/2010 | Iijima et al. .................. 348/340 |

* cited by examiner (a) SPHERICAL ABERRATION
(b) ASTIGMATISM
(c) DISTORTION

FIG.5
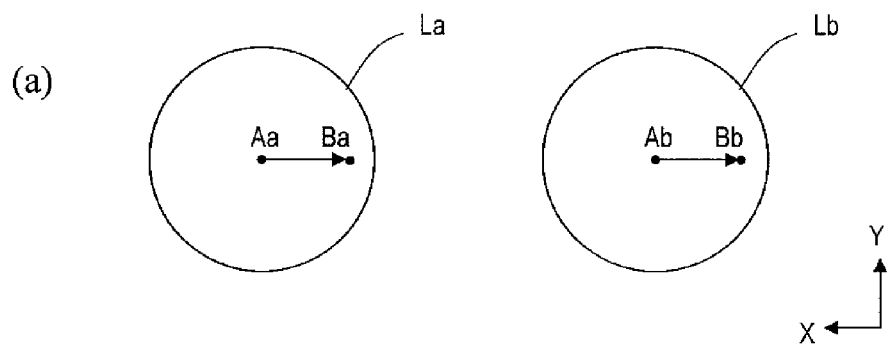
(a)
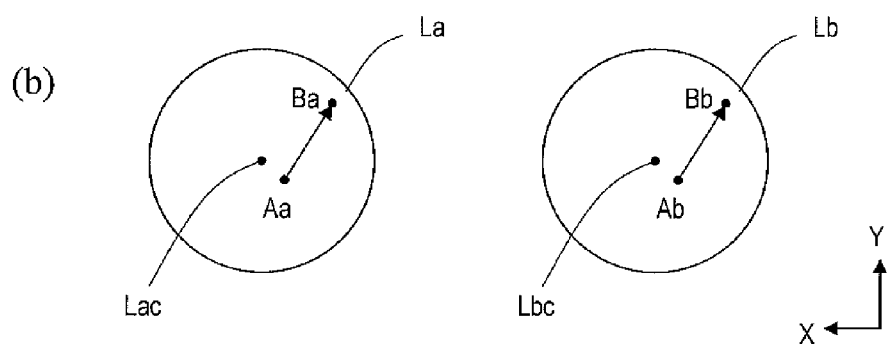
(b)
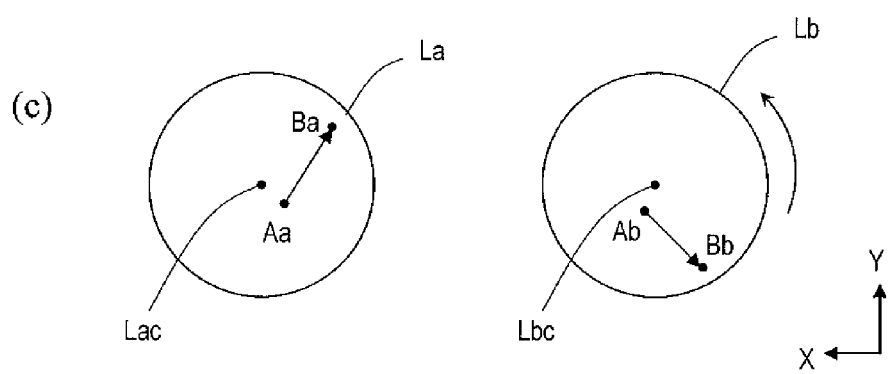
(c)

(a)　　　　　　　　　　　　(b)

MAGNITUDE OF PATTERN LOCATION SHIFT

BASE DIRECTION

■···Range Finding Accuracy ±1% or Less  □···Range Finding Accuracy More than ±1%

(a) SPHERICAL ABERRATION  (b) ASTIGMATISM  (c) DISTORTION (a)            (b)

■ ··· Range Finding Accuracy ±1% or Less   □ ··· Range Finding Accuracy More than ±1%

DISTANCE MEASURING DEVICE AND METHOD FOR MANUFACTURING SAME

TECHNICAL FIELD

The present invention relates to a distance measuring apparatus for determining the distance to an object based on a parallax between multiple optical systems.

BACKGROUND ART

Recently, a distance measuring apparatus has been used as a device for determining the distance to an object (i.e., the object of range finding) based on a parallax between a pair of optical systems. Specifically, such a device has been used to determine the distance between running cars and as a member of an autofocusing system for cameras or a three-dimensional shape measuring system.

Such a distance measuring apparatus includes a pair of lenses that are arranged side by side either horizontally or vertically and an imaging element with a pair of image capturing areas that are associated with the lenses, respectively. The pair of lenses produce images on their associated image capturing areas, and the distance to the object can be determined by carrying out triangulation based on the parallax between images that include images of the object which are obtained by the imaging element.

FIG. 21 illustrates the principle of triangulation carried out in a distance measuring apparatus. FIG. 21 shows a first optical system with an image capturing lens La and a second optical system with an image capturing lens Lb. These optical systems are arranged such that the optical axis Aa of the first optical system and the optical axis Ab of the second optical system run parallel to each other with a predetermined interval B left between them. A line segment that extends between the intersection of the optical axis Ab of the second optical system and an image capturing plane Nb and the intersection of the optical axis Aa of the first optical system and an image capturing plane Na is called a "base line", which is a line segment that never varies according to the position of the object and is used as a reference for triangulation. The length of that base line is equal to the interval B. Thus, the base line length will be identified herein by "B".

An image of the object U is formed by the image capturing lens L1 on the image capturing plane Na, while another image of the object U is formed by the image capturing lens L2 on the image capturing plane Nb. In FIG. 21, a point P on the object U is supposed to be a measuring point. If the point P is located on the optical axis Aa of the first optical system, an image of the point P will be focused at the intersection of the image capturing plane Na and the optical axis Aa of the first optical system. On the image capturing plane Nb, on the other hand, another image of the point P will be focused at a position which is distant by distance Δ from the intersection of the image capturing plane Nb and the optical axis a2 of the second optical system. This distance is called a "parallax" and its amount is called the "parallax amount Δ".

Supposing the focal length of the image capturing lenses La and Lb of the first and second optical systems is identified by f, the following approximation equation is satisfied:

[Formula 1]

$$\Delta \approx B \cdot \frac{f}{Z} \quad (1)$$

The images focused on the image capturing planes Na and Nb are subjected to correction, division and other kinds of processing so as to be processed easily by computational processing. By making pattern matching between the images focused on the image capturing planes Na and Nb after they have been subjected to those kinds of processing, the amount of parallax Δ can be obtained. And by substituting the amount of parallax Δ calculated, the base line length B and the focal length f into Formula (1), the distance Z can be obtained.

In a distance measuring apparatus, the range finding accuracy increases as the parallax amount Δ increases. According to Formula (1), as the base line length B and the focal length f increase, the parallax amount Δ also increases, and accordingly, the range finding accuracy increases.

Patent Document 1 discloses a distance measuring apparatus that uses a positive meniscus simple lens, having a convex surface on its object plane, to increase the focal length without increasing the overall length of the lens.

CITATION LIST

Patent Literature

Patent Document 1: Japanese Laid-Open Patent Publication No. 2003-15029

SUMMARY OF INVENTION

Technical Problem

The distance measuring apparatus includes a plurality of optical systems for capturing images, unlike general-purpose cameras. Thus, the distance measuring apparatus can achieve a higher range finding accuracy as the equality in image capturing performance between the optical systems of the distance measuring apparatus improves. However, in general, lenses have a decentration of about several micrometers between lens surfaces due to precision limit of their molds or manufacturing errors. Here, the "decentration between lens surfaces" refers to a state where the central axes of two lens surfaces which pass through the vertexes of the respective lens surfaces are not coincident with each other, i.e., misaligned from each other. The decentration may occur between lens surfaces at the two major surfaces of a simple lens or may occur between any two lens surfaces in an optical system that includes two or more lenses. If there is a decentration between lens surfaces, the rotational symmetry of the image capturing performance would deteriorate. Accordingly, during a parallax detection process by means of pattern matching, the detected parallax amount varies among image capture locations, and as a result, the range finding accuracy significantly deteriorates.

Patent Document 1 discloses an arrangement of lenses for a distance measuring apparatus but is silent about the potential decline in range finding accuracy due to a difference in image capturing performance between the respective lens surfaces that could be produced by some manufacturing error.

The present invention was conceived for the purpose of solving the above problems. One of the objects of the present invention is to provide a distance measuring apparatus that will produce little decline in range finding accuracy even if there is a decentration between lens surfaces.

Solution to Problem

A distance measuring apparatus of the present invention is a distance measuring apparatus for determining a distance to an object, including: a plurality of optical systems for forming images of the object; and an image capturing section having a plurality of image capturing areas which are associated with the plurality of optical systems on a one-to-one basis, the image capturing section being configured to convert images of the object formed in respective ones of the image capturing areas through the plurality of optical systems to electric signals, the distance to the object being determined based on a parallax between the images of the object formed through the plurality of optical systems, wherein each of the plurality of optical systems includes n lens surfaces, where n is an integer not less than 2, and a direction of a decentration between an $i^{th}$ lens surface and a $j^{th}$ lens surface (counting from the object side) is identical among at least one pair of the plurality of optical systems, where i and j are different integers each of which is not less than 1 and not more than n.

In a preferred embodiment, each of the at least one pair of optical systems includes at least one lens which is formed by injection molding and which has a gate mark, the at least one lens has the $i^{th}$ lens surface and the $j^{th}$ lens surface, and the azimuth of the gate mark relative to a center of the at least one lens is identical among the at least one pair of optical systems.

In a preferred embodiment, each of the at least one pair of optical systems includes one lens, and the one lens has the $i^{th}$ lens surface and the $j^{th}$ lens surface.

In a preferred embodiment, each of the at least one pair of optical systems includes a first lens and a second lens, and the first lens and the second lens have the $i^{th}$ lens surface and the $j^{th}$ lens surface, respectively.

In a preferred embodiment, each of the plurality of optical systems includes a lens barrel, the distance measuring apparatus further includes an auxiliary lens barrel for supporting the lens barrel of one of the pair of optical systems, and a holding member for holding the lens barrel of the other of the pair of optical systems and the auxiliary lens barrel in a predetermined spatial arrangement relative to the image capturing section, the lens barrel of the other of the pair of optical systems and the holding member have a screw structure for a fitting engagement therebetween, and the lens barrel of the one of the pair of optical systems and the auxiliary lens barrel have a screw structure for a fitting engagement therebetween, and the auxiliary lens barrel is rotatably supported by the holding member.

In a preferred embodiment, one of the $i^{th}$ lens surface and the $j^{th}$ lens surface is one of the n lens surfaces of each optical system which has the smallest radius of curvature, excluding a flat lens surface.

In a preferred embodiment, the $i^{th}$ lens surface and the $j^{th}$ lens surface are one of the n lens surfaces of each optical system which has the smallest radius of curvature and another one of the n lens surfaces which has the second smallest radius of curvature, excluding a flat lens surface.

An inventive method of manufacturing a distance measuring apparatus which includes a plurality of optical systems includes the steps of: providing a plurality of lenses formed by injection molding using the same mold; and arranging the plurality of lenses in a plurality of lens barrels for the optical systems such that a direction of a decentration between a pair of lens surfaces of the lenses is identical among at least one pair of the plurality of optical systems.

In a preferred embodiment, the step of arranging the plurality of lenses includes arranging the lenses such that azimuths of gate marks of the lenses relative to the optical axes of the lenses are identical among lens barrels of the at least one pair of optical systems.

A method of manufacturing a distance measuring apparatus according to the present invention is a method of manufacturing a distance measuring apparatus which includes a plurality of optical systems and an image capturing section, the image capturing section having a plurality of image capturing areas which are associated with the plurality of optical systems on a one-to-one basis, the method including the steps of: (A) providing at least one pair of lens barrels which are formed by injection molding using the same mold; (B) arranging at least two types of lenses in the pair of lens barrels to prepare at least one pair of the plurality of optical systems; (C) adjusting a position of one of the one pair of optical systems such that an image of an object is focused on one of the plurality of imaging areas; (D) adjusting a position of the other of the one pair of optical systems such that another image of the object is focused on another one of the plurality of imaging areas; and (E) making a direction of a decentration between any two lens surfaces of the at least two types of lenses is identical among the one pair of optical systems.

In a preferred embodiment, step (E) includes rotating the lens barrel of at least one of the one pair of optical systems relative to an optical axis of the optical system such that azimuths of gate marks of the lens barrels relative to the optical axes of the optical systems are identical among the one pair of optical systems.

In a preferred embodiment, among the two types of lenses in the one pair of lens barrels, lenses of the same type are formed by injection molding using the same mold, and step (B) includes arranging the two types of lenses such that azimuths of gate marks of the two types of lenses relative to the gate marks of the lens barrels of the one pair of optical systems are identical among the one pair of optical systems.

Advantageous Effects of Invention

According to the present invention, even when there is a decentration between two lens surfaces, the direction of the decentration is identical among at least two of a plurality of optical systems so that the deterioration of the range finding accuracy can be reduced, and the distance measurement can be realized with high accuracy.

BRIEF DESCRIPTION OF DRAWINGS

FIGS. 5(a) to 5(c) are diagrams which illustrate the direction of the decentration between lens surfaces in the two optical systems of the first embodiment.

DESCRIPTION OF EMBODIMENTS

First, a shift in location of a captured image pattern in a distance measuring apparatus which includes a plurality of optical systems is described. It is assumed herein that the plurality of optical systems have n lens surfaces, and there is a decentration between the $i^{th}$ lens surface and the $j^{th}$ lens surface due to mold errors or manufacturing errors. Here, n is an integer not less than 2, and i and j are different integers each of which is not more than n. In this specification, "lens surface" refers to a surface or interface of an optical element which has a function of changing the condensation state of light by means of refraction or diffraction.

Figure 1:
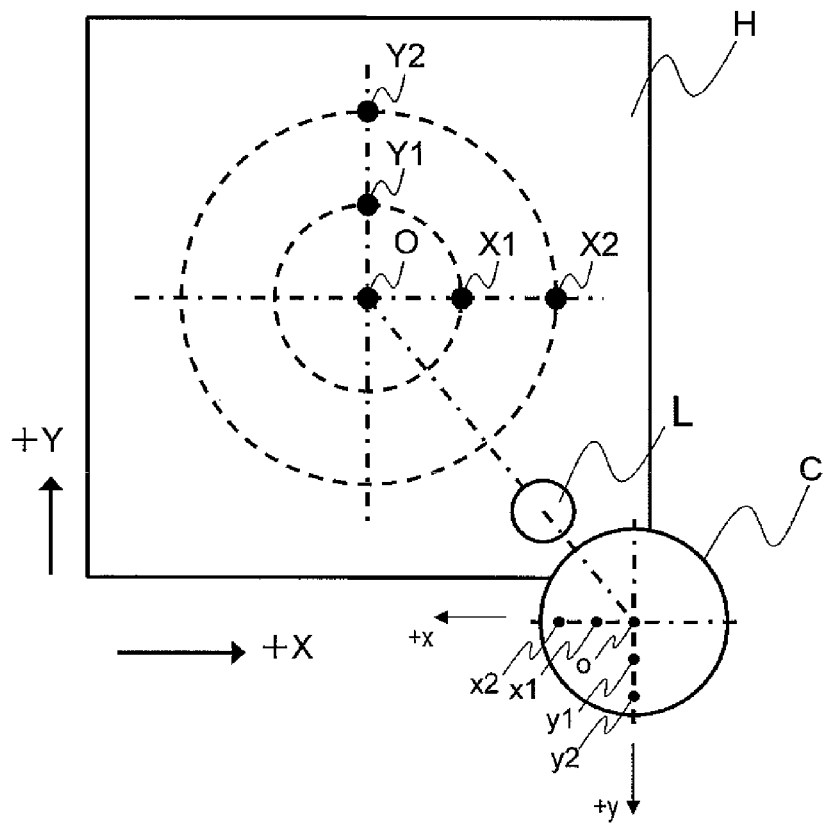
FIG. 1 is a concept diagram which shows a simulation model for illustration of the effect of lens decentration on image capturing.

FIG. 1 schematically illustrates an image of a plane chart H which is captured through an optical system L at a position distant from the plane chart H by a predetermined distance and which is formed in an effective image circle C (=$\phi$C). On the plane chart H, circular patterns O, X1, X2, Y1 and Y2 are drawn. The circular pattern O is located at the origin of the plane chart H, the circular patterns X1 and X2 are located on the X-axis, and the circular patterns Y1 and Y2 are located on the Y-axis.

In the effective image circle C, captured image patterns o, x1, x2, y1 and y2, which respectively correspond to the circular patterns O, X1, X2, Y1 and Y2 on the plane chart H, are focused. The captured image pattern o is located on the optical axis of the effective image circle C. On the other hand, the captured image patterns x1 and x2 are located at mutually different distances, which are respectively 40% and 80% of the maximum image height (i.e., the radius of the effective image circle C), from the origin in the +x direction. In the same way, the captured image patterns y1 and y2 are located at mutually different distances, which are respectively 40% and 80% of the maximum image height, from the origin in the +y direction.

Figure 2:
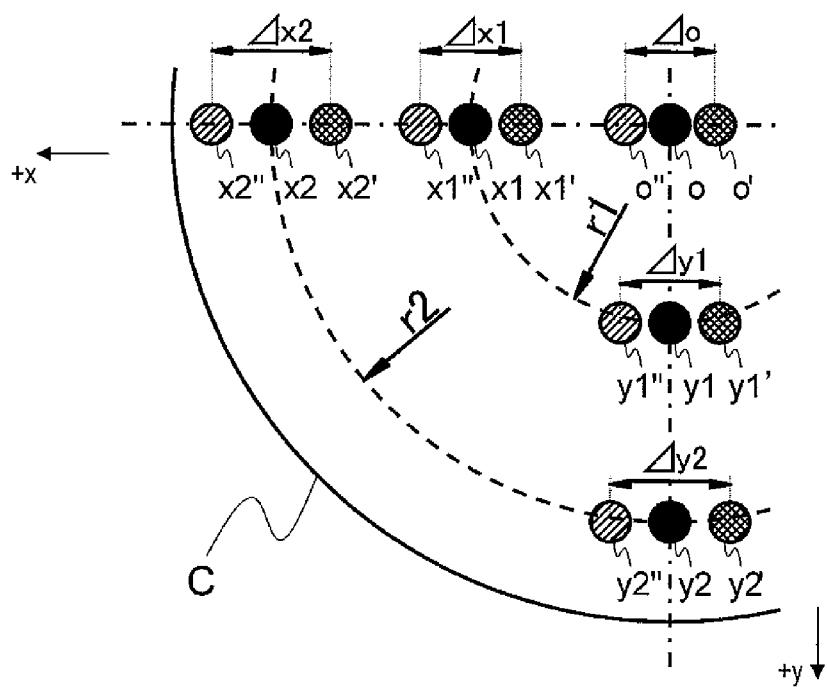
FIG. 2 illustrates a shift of captured image patterns which is caused by the decentration of a lens in the simulation model of FIG. 1.

FIG. 2 illustrates a shift in location of the captured image patterns which occurs when any one lens surface of a lens of the optical system L has a decentration under a condition where an image of the plane chart H is formed as illustrated in FIG. 1. Whether the direction of the location shift of the captured image patterns is identical with or opposite to the direction of the decentration of the lens surface depends on the optical system. Here, the description is provided on the assumption that the decentration direction of the lens surface is identical with the direction of the location shift of the captured image patterns.

When any one lens surface of a lens of the optical system L has a decentration in the +X direction (FIG. 1), the captured image patterns o, x1, x2, y1 and y2 shift in the –X direction to form patterns o', x1', x2', y1' and y2', respectively. When a lens on the image plane side has a decantation in the –X direction, the captured image patterns o, x1, x2, y1 and y2 shift in the +X direction to form patterns o", x1", x2", y1" and y2", respectively. In FIG. 2, $\Delta$o, $\Delta$x1, $\Delta$x2, $\Delta$y1 and $\Delta$y2 denote the relative magnitudes of pattern location shift of the captured image patterns o', x1', x2', y1' and y2' with respect to the locations of the captured image patterns o", x1", x2", y1" and y2". Generally speaking, when a lens surface of a lens L on the image plane side has a decentration, the magnitude of the shift varies depending on the position of image capturing.

In the case of an imaging element which has a single optical system, such as a digital camera or a video camera, the variation of the magnitude of the shift which occurs depending on the position of image capturing is detected as a distortion of the captured image. On the other hand, in the case of a distance measuring apparatus which has a plurality of optical systems, a captured image has a distortion in each optical system. In addition, if the direction of decentration and the magnitude of decentration are different among the plurality of optical systems, the distortion of the captured images is also different among the plurality of optical systems. Thus, decentration in the distance measuring apparatus causes a decrease in range finding accuracy, and the degree of the decrease in range finding accuracy disadvantageously varies depending on the position of image capturing.

Decentration may cause only a small distortion in the image. However, for example, in a small-size distance measuring apparatus in which the base line length and the focal distance are short, a detected parallax is small so that the distortion of the image due to decentration greatly affects the range finding accuracy. Even in the case of a large-size distance measuring apparatus in which the base line length and the focal distance are relatively long, the parallax is small when the distance to an object at a distant position is measured, so that the distortion of the image due to decentration greatly affects the range finding accuracy.

The distance measuring apparatus of the present invention includes a plurality of optical systems. Each of the plurality of optical systems includes n lens surfaces. Here, n is an integer not less than 2. Among at least one pair of the plurality of optical systems, the direction of the decentration between the $i^{th}$ lens surface and the $j^{th}$ lens surface (counting from the object side) is identical. Here, i and j are different integers each of which is not less than 1 and not more than n.

According to the present invention, the lens decentration itself cannot be changed, so that an image of an object which is formed through each optical system is distorted by the lens decentration. However, when the direction of the lens decentration is identical among at least one pair of the plurality of optical systems, images formed through the pair of optical systems have the same degree of distortion in the same direction. Thus, when the parallax is obtained, the effect of the decentration is canceled. As a result, deterioration of the range finding accuracy which is attributed to the decentration can be reduced. Therefore, a particularly advantageous effect is obtained in a situation that the parallax is small, such as a case where the distance is measured by a small-size distance measuring apparatus or a case where the distance to an object at a distant position is measured by a relatively large-size distance measuring apparatus. Hereinafter, the distance measuring apparatus of the present invention will be described in detail with reference to the drawings.

(First Embodiment)

Figure 3:
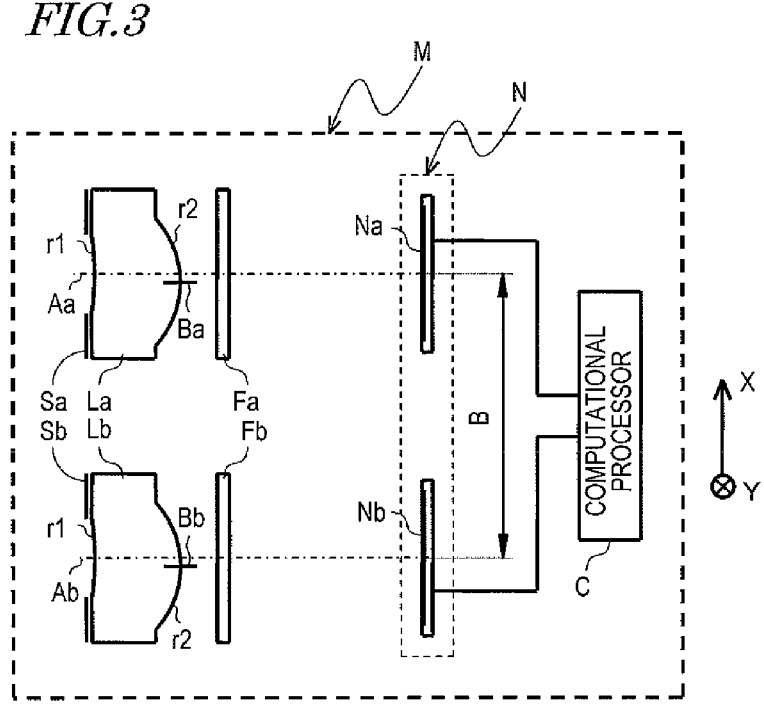
FIG. 3 is a cross-sectional view schematically showing the first embodiment of the distance measuring apparatus of the present invention.

Hereinafter, the first embodiment of the distance measuring apparatus of the present invention is described. FIG. 3 is a schematic view showing a structure of the distance measuring apparatus M of the present embodiment. The distance measuring apparatus M includes two optical systems which have simple lenses La, Lb, an image capturing section N, and a computational processor C.

The simple lenses L1 and L2 have substantially equal shapes. Specifically, each of the simple lenses L1 and L2 has a lens surface r1 at the object side and a lens surface r2 at the image capturing section N side. The shape of the lens surface r1 of the simple lens La is substantially equal to that of the lens surface r1 of the simple lens Lb. Also, the shape of the lens surface r2 of the simple lens La is substantially equal to that of the lens surface r2 of the simple lens Lb. The distance between the optical axes of the two optical systems is B, which is the base line length of the distance measuring apparatus M.

The image capturing section N includes image capturing areas Na, Nb which are associated with the optical systems formed by the simple lenses La, Lb on a one-to-one basis. The image capturing section N converts images of the object which are formed in the respective image capturing areas Na, Nb through the simple lenses La, Lb to electric signals. In the present embodiment, the image capturing areas Na, Nb are shown in the drawing as separate elements, although the image capturing areas Na, Nb may be realized by dividing the area of a single imaging element into areas which are associated with respective lenses on a one-to-one basis.

Figure 21:
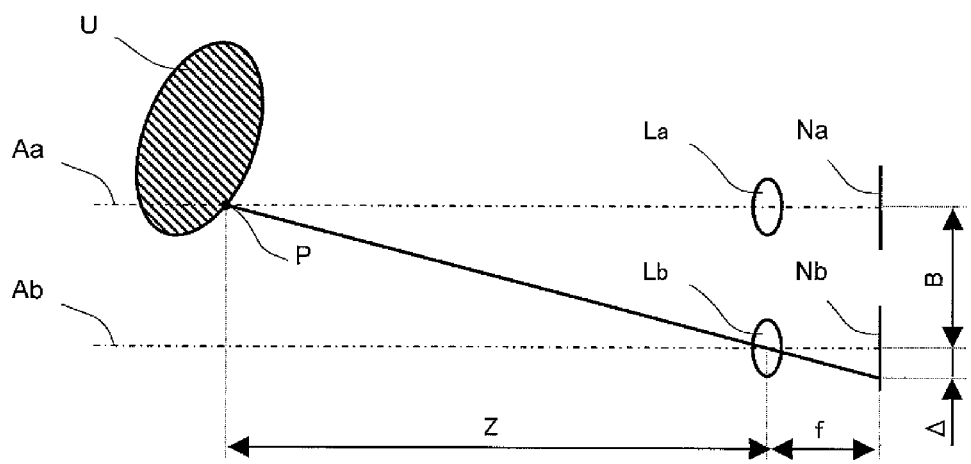
FIG. 21 is a diagram for illustration of the principle of triangulation in the distance measuring apparatus.

The computational processor C receives the electric signals from the image capturing section N to calculate the distance to the object (not shown) from the parallax between the images of the object obtained through the two optical systems. The method of calculating the distance to the object from the parallax is as previously described with reference to FIG. 21.

Preferably, the distance measuring apparatus M further includes stops Sa, Sb which are provided at the lens surface r1 side of the simple lenses La, Lb, and filters Fa, Fb interposed between the simple lenses La, Lb and the image capturing areas Na, Nb.

Table 1 below shows the design data for the respective optical systems of the distance measuring apparatus M shown in FIG. 3. In Table 1, Ri denotes the paraxial radius of curvature (mm), di denotes the interval (mm) between the centers of the respective planes, nd denotes the refractive index of the lens or the filter for d-line, and vd denotes the Abbe number of the lens or the filter for d-line. The first ($1^{st}$) filter surface and the second ($2^{nd}$) filter surface refer to a surface at the simple lens La (Lb) side and a surface at the image capturing area Na (Nb) side, respectively, of the filter Fa (or Fb). The aspheric shape is represented by Formula (2) below, where x is the distance as measured from the tangential plane at the vertex of the aspheric surface along the optical axis direction, h is the height as measured from the optical axis, r is the paraxial radius of curvature, k is the conic constant, and Am (where m=4, 6, 8, 10 or 12) is the $m^{th}$ aspheric coefficient.

TABLE 1

Lens data:
focal length = 5 mm, F value = 2.8, λ = 550 nm,
angle of view 2ω = 56.6°, and effective image capturing
circle diameter = φ5 mm

| Plane No. | Ri | di | nd | vd |
|---|---|---|---|---|
| Object | ∞ | 600 | — | — |
| Stop | ∞ | 0.15 | — | — |
| r1 surface | −9.5 | 2 | 1.5253 | 56.0 |
| r2 surface | −2.213702 | 0.1 | — | — |
| $1^{st}$ filter surface | ∞ | 0.3 | 1.5168 | 62.2 |
| $2^{nd}$ filter surface | ∞ | 5.07 | — | — |
| Image plane | ∞ | — | — | — |

Aspheric coefficients

| | k | A4 | A6 | A8 | A10 | A12 |
|---|---|---|---|---|---|---|
| r1 surface | 0 | −0.044049 | 0.029774 | 0.040788 | −0.134023 | 0.077096 |
| r2 surface | −3.621152 | −0.036587 | −0.004181625 | 0.0069269 | −0.003211169 | 0.000457618 |

[Formula 2]

$$x = \frac{\frac{1}{r}h^2}{1+\sqrt{1-(1+k)\left(\frac{1}{r}\right)^2 h^2}} + A_4 h^4 + A_6 h^6 + A_8 h^8 + A_{10} h^{10} + A_{12} h^{12} \quad (2)$$

Figure 4:
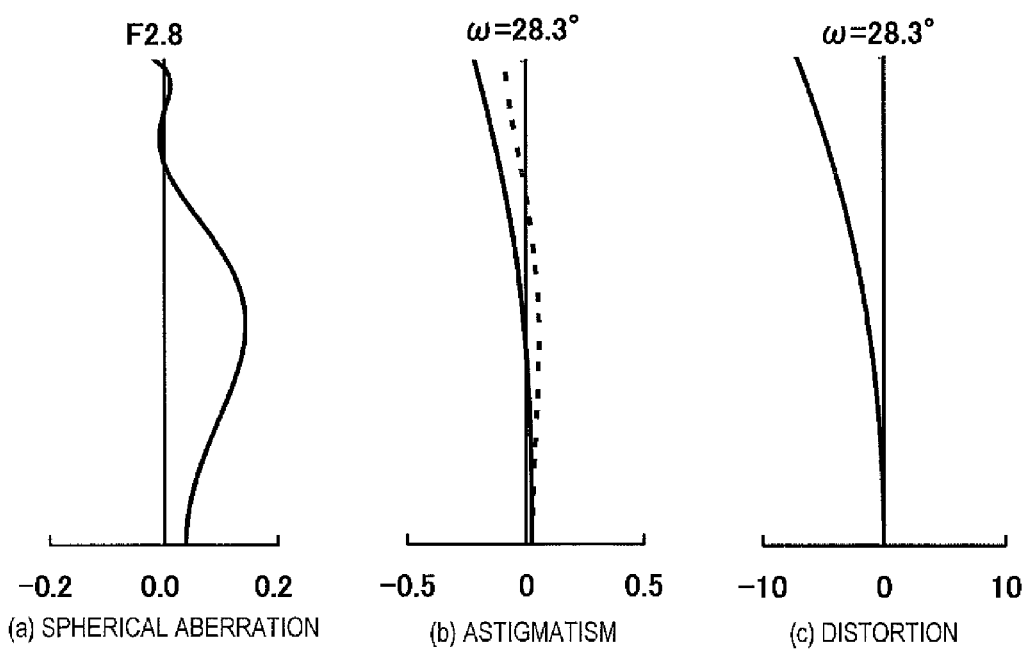
FIGS. 4(a) to 4(c) respectively show the spherical aberration, astigmatism, and distortion in the optical systems of the distance measuring apparatus of FIG. 3.

FIGS. 4(a), 4(b) and 4(c) respectively show the spherical aberration, astigmatism, and distortion of the respective optical systems. It can be seen from these graphs that all of these aberrations were corrected sufficiently.

In the distance measuring apparatus M of the present embodiment, to prevent the deterioration of the range finding accuracy which is attributed to decentration between lens surfaces, the simple lenses La, Lb have identical decentration directions. As shown in FIG. 3, in the simple lens La, the lens surface r1 has a central axis Aa which passes through the vertex of the lens surface r1 and which is perpendicular to the image capturing area Na, and the lens surface r2 has a central axis Ba which passes through the vertex of the lens surface r2 and which is perpendicular to the image capturing area Na. Likewise, in the simple lens Lb, the lens surface r1 has a central axis Ab which passes through the vertex of the lens surface r1 and which is perpendicular to the image capturing area Nb, and the lens surface r2 has a central axis Bb which passes through the vertex of the lens surface r2 and which is perpendicular to the image capturing area Nb.

FIG. 5(a) shows a decentration between the lens surface r1 and the lens surface r2 in the simple lens La and a decentration between the lens surface r1 and the lens surface r2 in the simple lens Lb. The decentration between two lens surfaces means a misalignment between the aforementioned central axes of the lens surfaces. The direction of decentration is expressed by a vector which originates from the central axis that passes through the vertex of one of the lens surfaces and which extends to the central axis that passes through the vertex of the other lens surface. For example, when considered relative to the lens surface r1, the direction of the decentration between the lens surface r1 and the lens surface r2 of the simple lens La is expressed by a vector extending from Aa to Ba as shown in FIG. 5(a). Likewise, the direction of the decentration between the lens surface r1 and the lens surface r2 of the simple lens Lb is expressed by a vector extending from Ab to Bb.

In the distance measuring apparatus of the present invention, the optical system includes n lens surfaces, and the direction of the decentration between the $i^{th}$ lens surface and the $j^{th}$ lens surface (counting from the object side) is identical among a plurality of optical systems. Here, n is an integer not less than 2, and i and j are different integers each of which is not more than n. Specifically, as shown in FIG. 5(a), the direction of a vector extending from the central axis Aa to the central axis Ba of the simple lens La and the direction of a vector extending from the central axis Ab to the central axis Bb of the simple lens Lb are identical. Here, "identical" refers not only to a case where the angle formed by the two vectors is 0° but also to a case where the angle formed by the two vectors is not more than 15°. In the example of the present embodiment, the central axes Ba and Bb have a decentration of −5 μm in the X direction relative to the central axes Aa and Ab, respectively. However, the decentration directions are identical.

Thus, to make the simple lenses La and Lb have identical decentration directions, it is preferred that the simple lenses La and Lb are manufactured by injection molding using the same mold. Thereby, the simple lenses La and Lb have equal decentration magnitudes.

Further, to make the simple lenses La and Lb have identical decentration directions, a gate mark which is formed in the injection molding process is used as a reference mark to arrange the simple lenses La and Lb such that the azimuths of their gate marks relative to the lens centers are identical, whereby the decentration directions are made identical.

Figure 6:
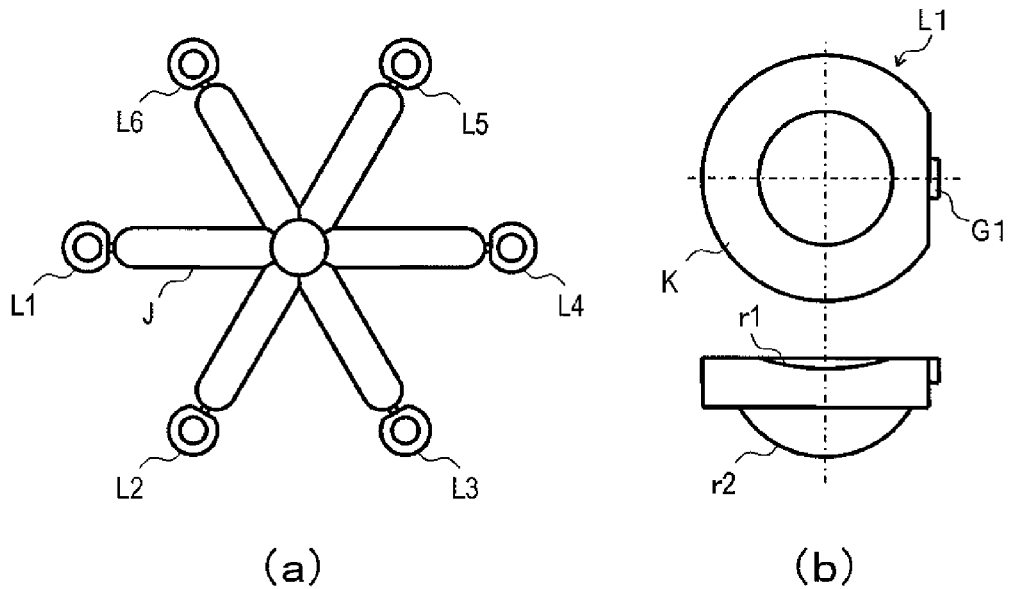
FIG. 6(a) illustrates a state of injection-molded simple lenses for used in the distance measuring apparatus of FIG. 3 when separated from a mold.
FIG. 6(b) illustrates a state of a simple lens when separated from a runner.

When a plurality of lenses are manufactured by injection molding from a single mold, it is preferred that simple lenses obtained from the same cavity are used as the simple lenses La and Lb. FIG. 6(a) is a schematic view which illustrates a state of simple lenses made of a resin when separated from a mold which is capable of manufacturing a plurality of lenses at one time. Here, six pieces of lens, lens L1 to lens L6, can be molded at one time.

In FIG. 6(a), each of the lens L1 to L6 is a simple lens, and J denotes a runner. FIG. 6(b) shows the simple lens L1 separated from the runner, where K denotes a base surface that is an ineffective area of the lens, and G1 denotes a gate mark. In the portion of the gate mark G1, the lenses may sometimes have a so-called "D-cut" shape as shown in FIG. 6(b) such that the gate mark G1 is not caught by the lens barrels when the lenses are inserted in the lens barrels in the assemblage step. In this case, even if the gate mark G1 is completely cut away, a flat portion of the D-cut shape functions as a gate mark.

Figure 7:
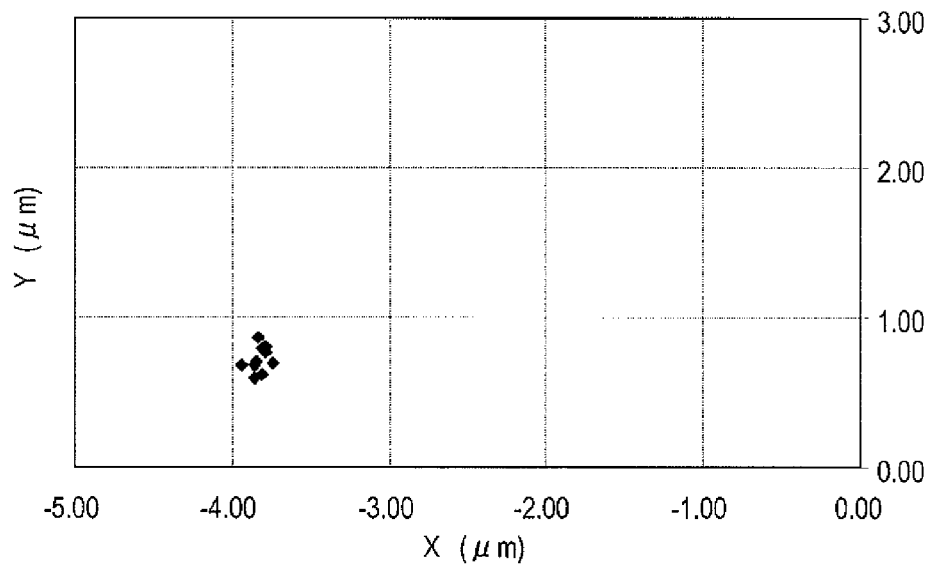
FIG. 7 is a graph which shows the measurement results of the amount of the decentration of an injection-molded simple lens.

FIG. 7 shows the results of measurement of the magnitude of the decentration between the center of the lens surface at the object side of a simple lens and the center of the lens surface at the image capturing area side of the simple lens, for simple lenses manufactured from the same mold. The measurement was carried out on 10 lens pieces with their gate marks being oriented in the same direction. As seen from FIG. 7, when the same mold is used, the manufactured lenses have substantially identical decentration directions and substantially equal decentration magnitudes. Therefore, in the process of assembling the distance measuring apparatus, lenses molded using the same cavity of the same mold are arranged such that the azimuths of their gate marks are identical, whereby the direction and magnitude of the decentration between the center of the lens surface at the object side and the center of the lens surface at the image capturing area side are relatively equal among the plurality of lenses.

In the above example, the central axis of the object-side lens surface r1 of the simple lenses La and Lb is coincident with the center of the circumference of the lens La. However, even when both the central axes of the lens surfaces r1 and r2 of the simple lenses La and Lb are deviated from the centers of the circumferences of the simple lenses La and Lb, the direction and magnitude of the decentration between the center of the lens surface at the object side and the center of the lens surface at the image capturing area side can be relatively equal among the plurality of simple lenses so long as the simple lenses La and Lb are manufactured using the same cavity of the same mold as described above. As shown in FIG.

5(b), when the optical axes Aa and Ab of the lens surfaces r1 are deviated from the centers Lac and Lbc of the circumferences of the lenses La and Lb, the direction of the decentration between the lens surface r1 and the lens surface r2 is expressed by a vector extending from Aa to Ba. Likewise, in the simple lens Lb, the direction of the decentration between the lens surface r1 and the lens surface r2 is expressed by a vector extending from Ab to Bb. Thus, for example, when these two vectors are not identical as shown in FIG. 5(c), the simple lens Lb is rotated as illustrated by the arrow such that the azimuths of the gate marks of the lenses La and Lb are identical, whereby the decentration directions are made identical as shown in FIG. 5(b).

Figure 8:
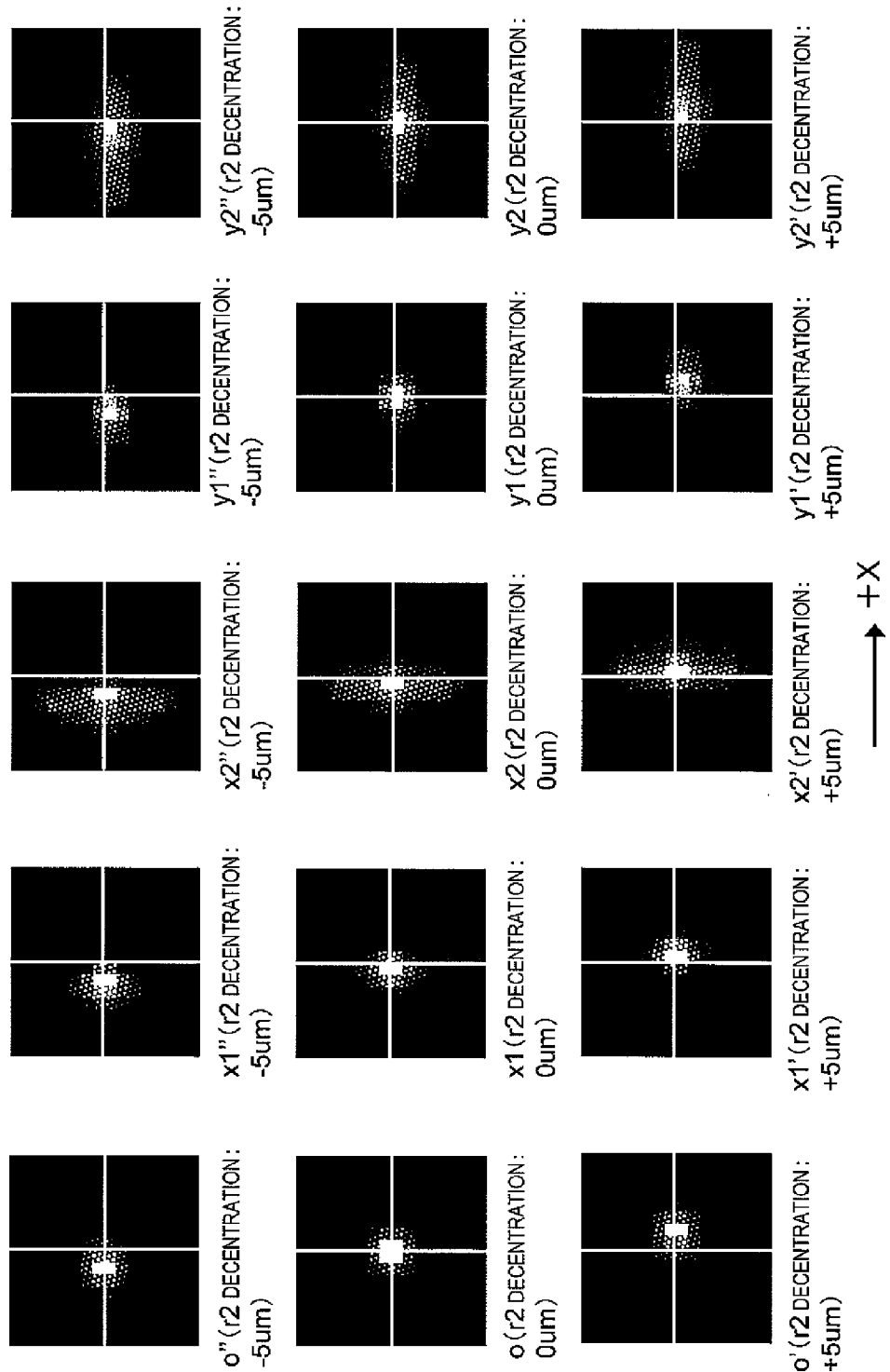
FIG. 8 show diagrams for illustration of shifts of captured image patterns in the cases of lens decentration in the optical system of the first embodiment based on the simulation results.

FIG. 8 shows the results of a simulation for measurement of the shift of an image which is captured when there is a decentration between two lens surfaces relative to an image which is captured when there is no decentration. In this simulation, the optical systems are designed based on the design data shown in Table 1. The positions of images formed with the central axis of the lens surface at the image capturing area side being shifted in the X direction by −5 μm, 0 μm, and +5 μm were analyzed by ray tracing.

In each of the illumination distribution diagrams of captured image patterns o", x1", x2", y1", y2", o, x1, x2, y1, y2, o', x1', x2', y1', y2' shown in FIG. 8, 16×16 pixels are in a matrix arrangement where a pixel with relatively higher illuminance is shown as a pixel with higher lightness. Note that, for convenience of illustration, the degree of lightness is expressed by the proportion of the white area in each pixel. In each of the illumination distribution diagrams, each one of the areas in a grid pattern arrangement represents one pixel, and the pixel pitch is 6 μm.

In FIG. 8, the illumination distributions of the captured image patterns o, o' and o" are now compared. A portion of the captured image pattern o" with the highest illuminance (shown in white) corresponds to two vertically-adjacent pixels in the central region of the illumination distribution diagram. A portion of the captured image pattern o with the highest illuminance corresponds to four pixels which are arranged in two rows and two columns in the central region of the illumination distribution diagram. The center of the highest illuminance portion of the captured image pattern o" is deviated in the −x direction with respect to the center of the highest illuminance portion of the captured image pattern o. On the other hand, the center of the highest illuminance portion of the captured image pattern o' is deviated in the +x direction with respect to the center of the highest illuminance portion of the captured image pattern o. The same applies to the other captured image patterns x1, x1', x1", . . . , y", in which the center of the highest illuminance portion is deviated in the x direction. It is understood from this result that the position of the captured image pattern can be deviated due to decentration.

Further, for example, the deviation of the captured image patterns o, o' and o" is different from the deviation of the captured image patterns x1, 1' and x1". It is understood from this result that, when there is a decentration, the magnitude of the shift of the captured image pattern varies depending on its position.

The parallax operation in range finding is derived by pattern matching, and therefore, the magnitudes of the shifts of the captured image patterns, Δo, Δx1, Δx2, Δy1, Δy2, are also derived by pattern matching. The degree of correlation in pattern matching is obtained by an evaluation function called "SAD (Sum of Absolute Difference)", which is the sum of the absolute differences in pixel intensity between a given small area and a reference small area. Supposing the operation block size of the small area is given by m×n pixels, the SAD is calculated by the following Formula (3):

[Formula 3]

$$\sum_{i=0}^{m-1} \sum_{j=0}^{n-1} |I0(i, j) - I1(i + dx, j)| \quad (3)$$

Figure 9:
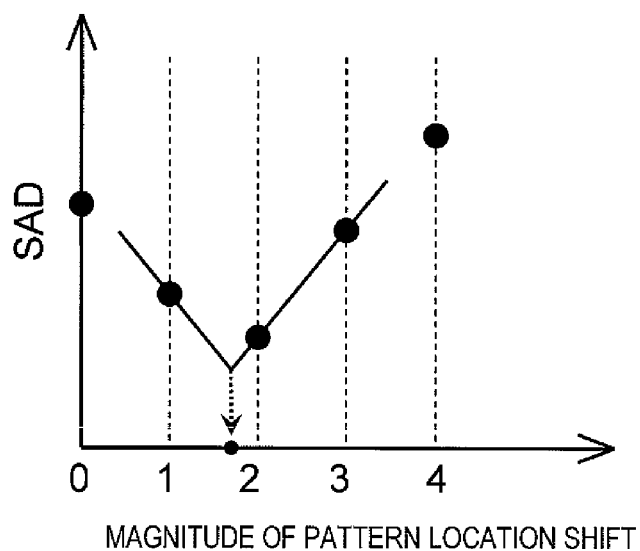
FIG. 9 is a diagram for illustration of a SAD operation.

In Formula (3), i and j represent the coordinates of the calculation block and I0 and I1 respectively represent the intensity values in the given and reference areas, of which the locations are specified by the coordinates in the parentheses. The SAD is calculated with the reference search block area moved with respect to the given calculation block area. And the magnitude of movement associated with a local minimum SAD is the magnitude of shift described above. According to this simulation, the search block is supposed to be moved in the +X direction shown in FIG. 8. FIG. 9 is a graph illustrating how to calculate the SAD. In this example, the SAD is calculated on a pixel-by-pixel basis. However, the SAD can also be calculated on a subpixel basis by performing some interpolation processing.

Table 2 shows the magnitudes of the shifts of the captured image patterns, Δo, Δx1, Δx1, Δy1, Δy2, with the simple lenses La, Lb of the present embodiment, which were derived using SAD. As previously described, when the lens surface at the image capturing area side has a decentration, the magnitude of the shift of the captured image pattern varies depending on the position of image capturing.

TABLE 2

| | Magnitude of Shift of Captured Image Pattern |
|---|---|
| Δo | 16.41 |
| Δx1 | 15.68 |
| Δx2 | 15.96 |
| Δy1 | 15.49 |
| Δy2 | 14.04 |

Figure 10:
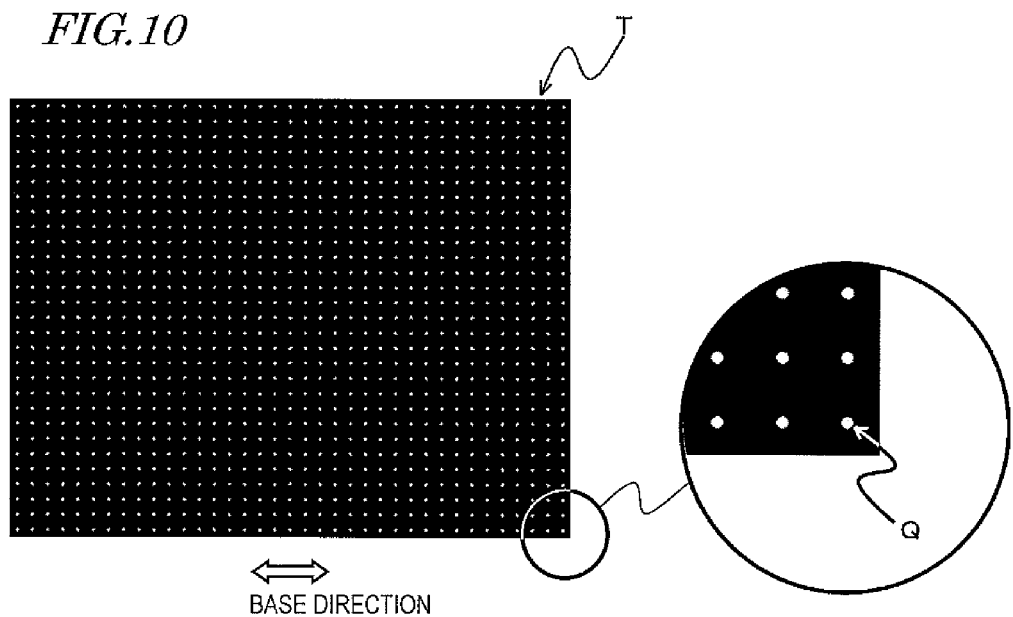
FIG. 10 is a diagram showing a plane chart for use in a range finding accuracy simulation of the first embodiment.
Figure 11:
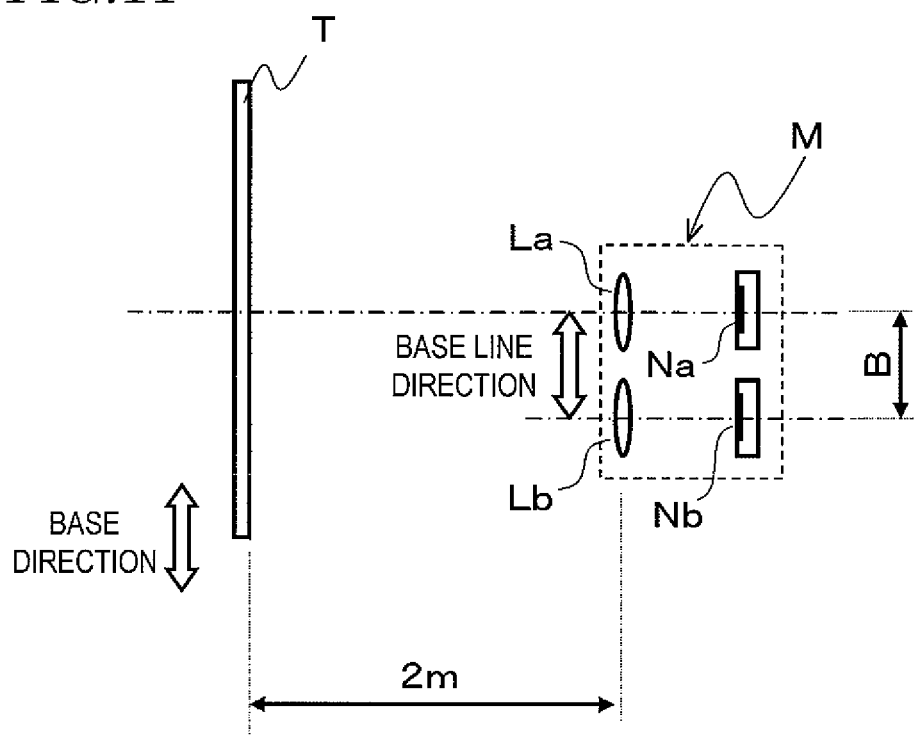
FIG. 11 is a diagram which illustrates the positional relationship between the distance measuring apparatus and the plane chart in the range finding accuracy simulation of the first embodiment.

Next, the simulation results of the range finding accuracy according to the present embodiment are described. FIG. 10 shows a plane chart T for examination of the range finding accuracy, which is to be used in analysis. In the plane chart T shown in FIG. 10, circular patterns Q are arranged in 37 columns×29 rows. FIG. 11 is a schematic view which illustrates the positional relationship between the plane chart T and the distance measuring apparatus M. This plane chart T is placed 2 meters away from the distance measuring apparatus M, and an image obtained at an imaging element Na on the simple lens La side and an image obtained at an imaging element Nb on the simple lens Lb side are reproduced by simulation.

On the simple lens La side, a base image is obtained which functions as a basis for parallax search, while on the simple lens Lb side, a reference image is obtained which functions as a reference for parallax search. Note that the distance measuring apparatus M is arranged as shown in FIG. 11 such that the center of the plane chart T is coincident with the central axis of the optical system on the simple lens La side and that the direction of the base of the plane chart T is identical with the direction of the base line of the distance measuring apparatus M. The base line length B is 6 mm.

The reproduced image has such a size that the size of the base image on the simple lens La side is 592×464 pixels. The parallax operation is performed on a block by block basis, each block consisting of 16×16 pixels. Therefore, the number of operation blocks is 37 columns×29 rows, which is equal to that of the circular patterns Q. In the simulation, for the sake of convenience, the size of the chart T is determined such that each circular pattern can be accommodated in each operation block. For the parallax of each block, the evaluation function SAD represented by Formula (3) is used. However, the pitch of the circular patterns on the image is approximately 16 pixels, and therefore, the maximum parallax search area is set to 14 pixels in order to prevent a detection error of the parallax by the SAD operation. Thus, the size of the reference image on the simple lens Lb side is 606×464 pixels.

The base image and the reference image reproduced by the simulation are converted to images which can be subjected to the parallax operation using predetermined calibration parameters. The "calibration parameters" refer to parameters for use in camera parallelizing correction, distortion correction, and lens shading correction.

After the image conversion, the parallax operation was performed on a block by block basis, each block consisting of 37 columns×29 rows. The range finding accuracy was mapped to obtain the results shown in FIGS. 12(a) to 12(c). In the mapping of the range finding accuracy, only squares in which the range finding accuracy is in the range of ±1% are represented by black boxes in the grid pattern.

Figure 12:
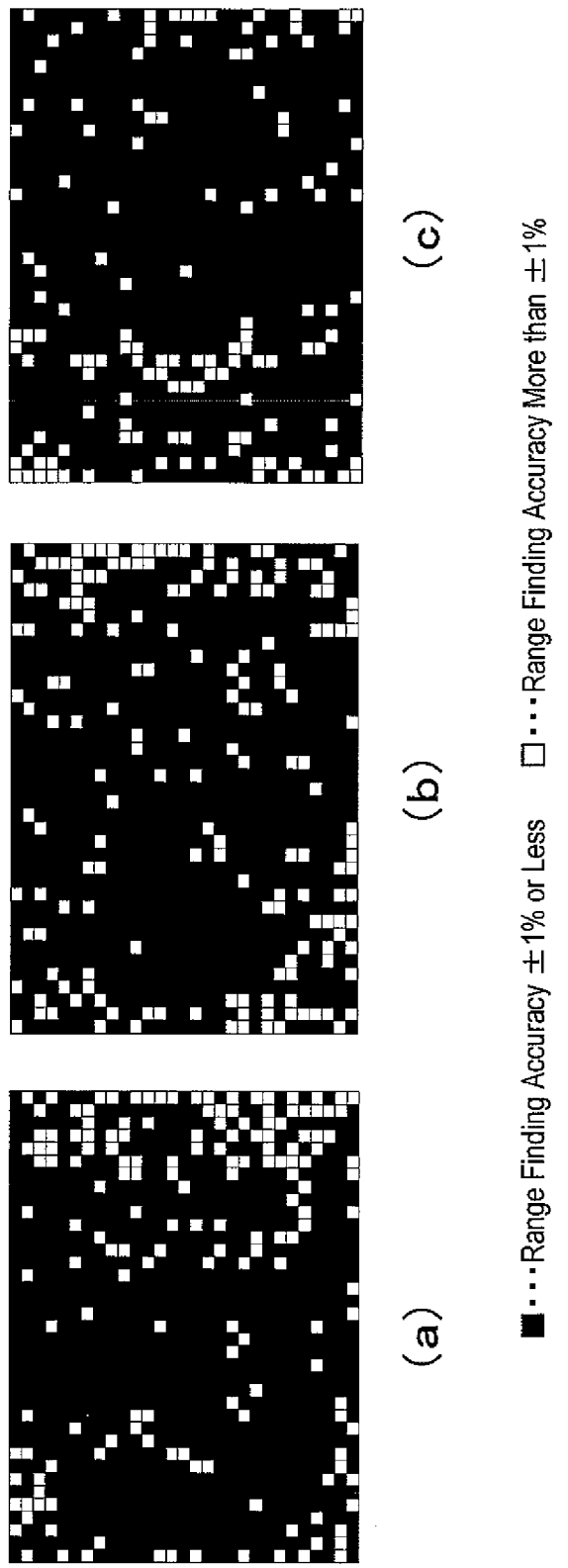
FIGS. 12(a) and 12(b) show the results of the range finding accuracy simulation of the first embodiment.
FIG. 12(c) shows the result of the range finding accuracy simulation in the case of no lens decentration.

FIG. 12(a) shows a range finding accuracy map in the case where, in both the simple lenses La, Lb, the lens surface r2 at the image capturing plane side has a deviation of −5 μm in the X direction as shown in FIG. 1. The decentration direction of the simple lens La is completely identical with the decentration direction of the simple lens Lb (angle difference 0°). FIG. 12(b) shows a range finding accuracy map in the case where the angle difference between the decentration direction of the simple lens La and the decentration direction of the simple lens Lb is 15°. FIG. 12(c) shows a range finding accuracy map in the case where, in both the simple lenses La, Lb, the lens surface r2 at the image capturing area side has no decentration.

As clearly seen from the comparison of FIG. 12(c) with FIGS. 12(a) and 12(b), even when there is a decentration in the simple lenses La, Lb, the deterioration of the range finding accuracy is fairly small, as compared with the case where there is no decentration, so long as the decentration directions are identical or the angle difference between the decentration directions is about 15° or less. Therefore, when the decentration directions are generally equal in the range of 15° or less, substantial deterioration of the range finding accuracy would not occur. Note that the images reproduced by the simulation consist of a limited number of light rays and therefore contain some noise. Accordingly, the range finding accuracy maps also contain some errors.

Figure 13:
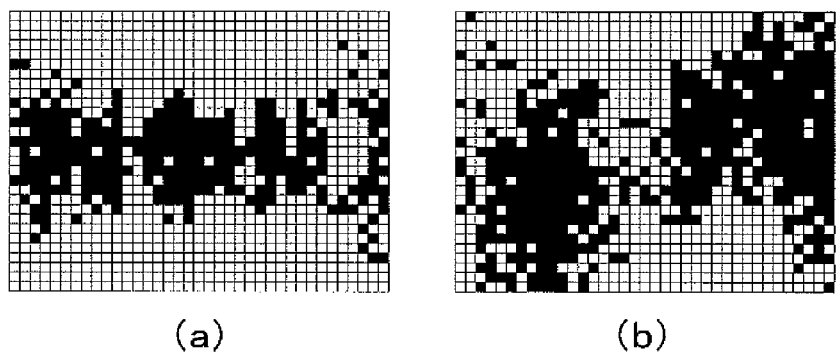
FIGS. 13(a) and 13(b) show the results of the range finding accuracy simulation of comparative examples.

FIG. 13(a) is a range finding accuracy map in the case where the central axis of the lens surface r2 at the image capturing area side of the simple lens Lb has a decentration of +5 μm in the X direction as opposed to the simple lens La, i.e., the decentration directions of the simple lens La and the simple lens Lb are different by 180°. FIG. 13(b) is a range finding accuracy map in the case where the central axis of the lens surface r2 at the image capturing area side of the simple lens Lb has a decentration of +5 μm in the Y direction (and a decentration of 0 μm in the X direction), i.e., the decentration directions of the simple lens La and the simple lens Lb are different by 90°.

As clearly seen from the comparison of FIGS. 13(a) and 13(b) with FIGS. 12(a) and 12(b), when the decentration directions are different by 90° or 180°, the range finding accuracy significantly deteriorates.

Thus, according to the present invention, even when there is a decentration between two lens surfaces, the direction of the decentration is identical among at least two of a plurality of optical systems, so that the deterioration of the range finding accuracy can be reduced, and the distance measurement can be realized with high accuracy.

In the above-described embodiment, the $i^{th}$ and and $j^{th}$ lens surfaces may be a spherical surface, an aspheric surface, or a planar surface. These lens surfaces are the two major surfaces of an optical lens which is capable of changing the condensation state of light by means of refraction. However, the lens surfaces may have a function of changing the condensation state of light by means of diffraction. Alternatively, the lens surfaces may be a surface of an optical adjustment layer provided over a lens surface that is capable of changing the condensation state of light.

Figure 14:
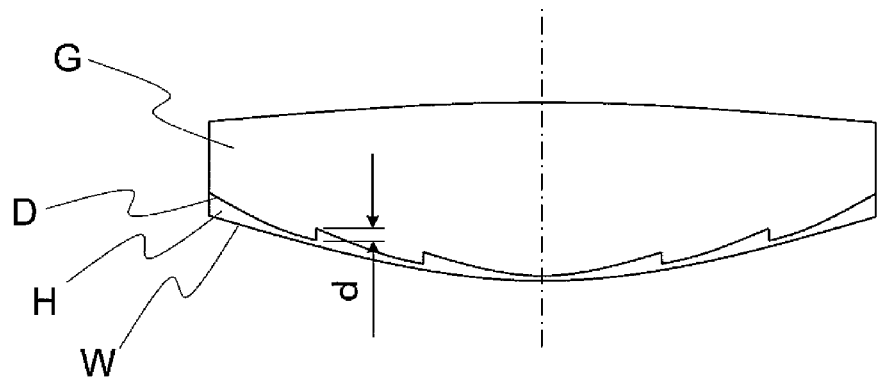
FIG. 14 is a schematic cross-sectional view showing another example of a lens surface included in an optical system of the distance measuring apparatus of the present invention.

Specifically, the $i^{th}$ and $j^{th}$ lens surfaces may be a diffraction surface which has a diffraction grating and a surface of an optical adjustment layer provided over the diffraction surface. For example, consider an optical element that has a diffraction surface D which is obtained by forming a diffraction grating over a surface of a base element G and an optical adjustment layer H which is provided over the diffraction surface D as shown in FIG. 14. The optical adjustment layer is provided for the purpose of maintaining the diffraction efficiency at high levels over a wide wavelength range. Here, d is the blaze height d of the diffraction grating provided over the diffraction surface D. The refractive indices of the base element G and the optical adjustment layer H for wavelength $\lambda 0$ are $n1(\lambda)$ and $n2(\lambda)$, respectively. The wavelength of light passing through the optical element is $\lambda$. In this case, the combination of the refractive indices of the base element G and the optical adjustment layer H is determined such that d in Formula (4) shown below is approximately constant for an arbitrary wavelength $\lambda$ within the wavelength range of light used. By this arrangement, the diffraction efficiency of the optical element for a predetermined wavelength range is maintained at values near 100%.

[Formula 4]

$$d = \frac{\lambda}{|n1(\lambda) - n2(\lambda)|} \quad (4)$$

In the optical element with such a structure, the diffraction surface D and the surface W of the optical adjustment layer H are the $i^{th}$ and $j^{th}$ lens surfaces which have been described in the above embodiment, where j=1+1. In the optical element shown in FIG. 14, when the central axis of the optical adjustment layer H has a decentration relative to the central axis of the diffraction surface D, a formed image has a distortion as previously described in the present embodiment. Thus, in a distance measuring apparatus that includes a plurality of optical systems which have such optical elements, the direction of the decentration is made identical among a pair of optical systems, whereby the effect of the decentration can be canceled.

(Second Embodiment)

Figure 15:
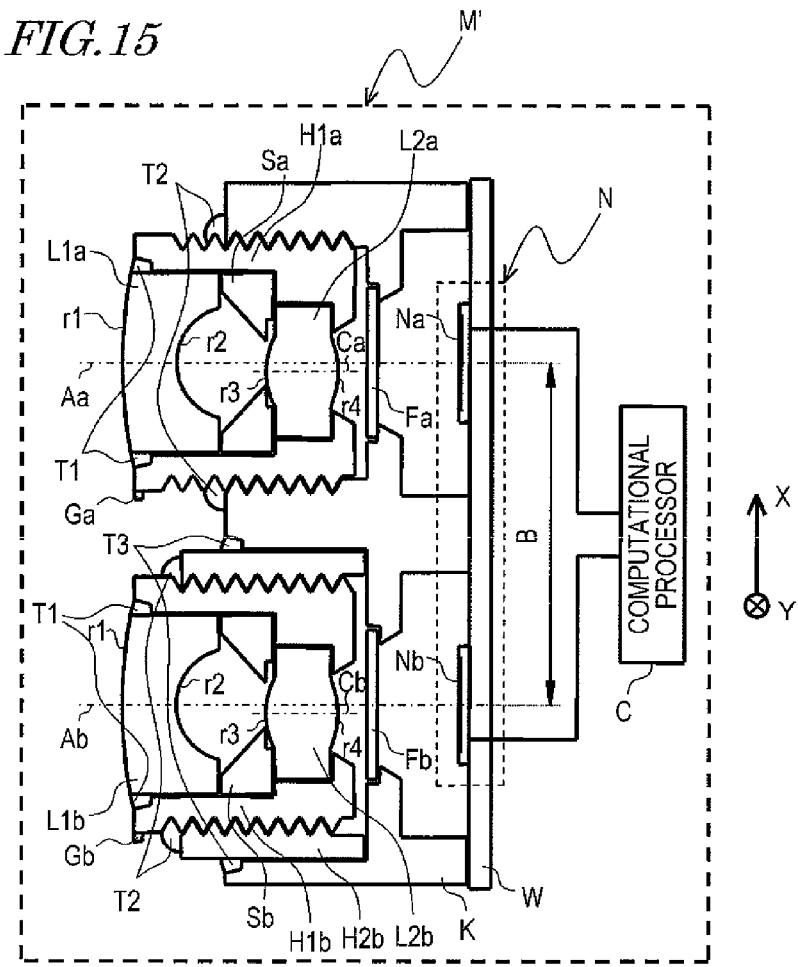
FIG. 15 is a cross-sectional view schematically showing the second embodiment of the distance measuring apparatus of the present invention.

Hereinafter, the second embodiment of the distance measuring apparatus of the present invention is described. FIG. 15 is a schematic view showing a structure of the distance measuring apparatus M' of the present embodiment. The distance measuring apparatus M' includes two optical systems, an image capturing section N, and a computational processor C.

The distance measuring apparatus M' is different from the first embodiment in that an optical system is formed by two pieces of lenses. Specifically, each optical system includes a first group lens L1a, L1b which has a lens surface r1 at the object side and a lens surface r2 at the image capturing area side, and a second group lens L2a, L2b which has a lens surface r3 at the object side and a lens surface r4 at the image capturing area side.

At the lens surface r3 side of the second group lens L2a, L2b, a stop Sa, Sb is provided. Between the second group lens L2a, L2b and the image capturing area Na, Nb, a filter Fa, Fb is provided. B denotes the base line length of the distance measuring apparatus.

The first group lens L1a, the stop Sa, and the second group lens L2a are inserted into a lens barrel H1a and fixed with an adhesive agent T1. The first group lens L1b, the stop Sb, and the second group lens L2b are inserted into a lens barrel H1b and fixed with an adhesive agent T1. Further, the lens barrel H1b is fixed to an auxiliary lens barrel H2b with an adhesive agent T2. The lens barrel H1a and the auxiliary lens barrel H2b are fixed to a holding member K with the adhesive agents T2 and T3, respectively. The holding member K and the image capturing section N are fixed to a mounting substrate W. The external perimeter portion of the lens barrel H1a and the holding member K have a screw structure for a fitting engagement therebetween. Likewise, the external perimeter portion of the lens barrel H1b and the inner perimeter portion of the auxiliary lens barrel H2b have a screw structure for a fitting engagement therebetween. These structures enable focus adjustment in the respective optical systems by means of rotation of the barrels.

equal to that of the lens surface r3 at the object side of the second group lens L2b. The shape of the lens surface r4 at the image capturing section N side of the second group lens L2a is substantially equal to that of the lens surface r4 at the image capturing section N side of the second group lens L2b.

The image capturing section N includes image capturing areas Na, Nb which are associated with the two optical systems on a one-to-one basis. The image capturing section N converts images of the object which are formed in the respective image capturing areas Na, Nb through the optical systems to electric signals. In the present embodiment, the image capturing areas Na, Nb are shown in the drawing as separate elements, although the image capturing areas Na, Nb may be realized by dividing the area of a single imaging element into areas which are associated with respective lenses on a one-to-one basis.

The computational processor C receives the electric signals from the image capturing section N to calculate the distance to the object (not shown) from the parallax between the images of the object obtained through the two optical systems. The method of calculating the distance to the object from the parallax is as previously described with reference to FIG. 21.

Table 3 below shows the design data for the respective optical systems of the distance measuring apparatus shown in FIG. 15. The symbols in Table 3 are the same as those shown in Table 1.

Figure 16:
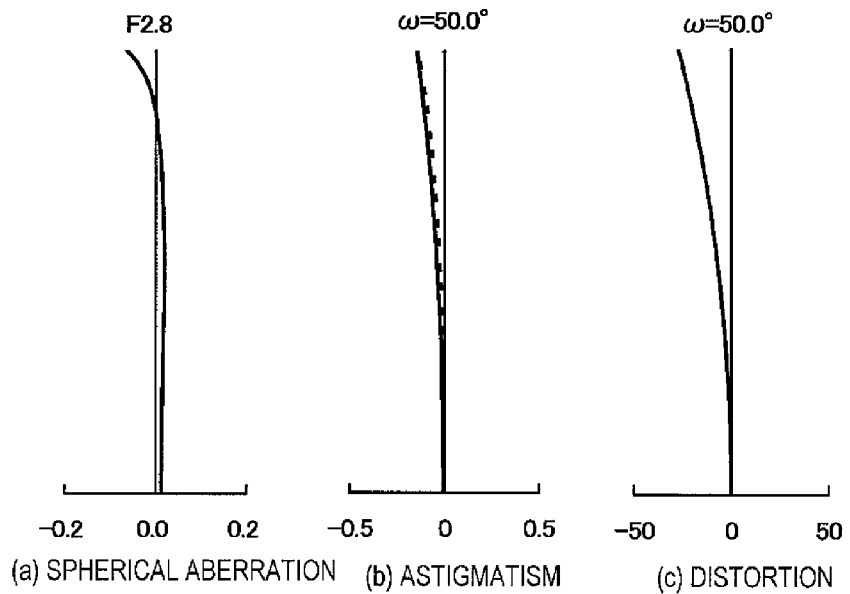
FIGS. 16(a) to 16(c) respectively show the spherical aberration, astigmatism, and distortion of the optical systems of the distance measuring apparatus of FIG. 15.

FIGS. 16(a), 16(b) and 16(c) respectively show the spherical aberration, astigmatism, and distortion of the respective optical systems. It can be seen from these graphs that all of these aberrations were corrected sufficiently.

TABLE 3

Lens data:
focal length = 2.89 mm, F value = 2.8, λ = 550 nm,
angle of view 2ω = 100.0°, and effective image capturing
circle diameter = φ5 mm

| Plane No. | Ri | di | nd | vd |
|---|---|---|---|---|
| Object | ∞ | 600 | — | — |
| r1 surface | 23.659231 | 2.5 | 1.7725 | 49.6 |
| r2 surface | 2.637686 | 4.2 | — | — |
| Stop | ∞ | 0 | — | — |
| r3 surface | 3.490437 | 3.35 | 1.5253 | 56.0 |
| r4 surface | −3.385878 | 0.2 | — | — |
| 1$^{st}$ filter surface | ∞ | 0.5 | 1.5168 | 62.2 |
| 2$^{nd}$ filter surface | ∞ | 4.9 | — | — |
| Image plane | ∞ | — | — | — |

Aspheric coefficients

| | k | A4 | A6 | A8 | A10 | A12 |
|---|---|---|---|---|---|---|
| r3 surface | 3.642158 | −0.016791 | −0.001781888 | 0.001631271 | −0.00288725 | 0.001104879 |
| r4 surface | −5.532864 | −0.010116 | 0.002979397 | 0.000211228 | −0.000221973 | 0.000041532 |

The plurality of first group lenses L1a, L1b have substantially equal shapes. Specifically, the shape of the lens surface r1 at the object side of the first group lens L1a is substantially equal to that of the lens surface r1 at the object side of the first group lens L1b. The shape of the lens surface r2 at the image capturing section N side of the first group lens L1a is substantially equal to that of the lens surface r2 at the image capturing section N side of the first group lens Lb. Also, the plurality of second group lenses L2a, L2b have substantially equal shapes. Specifically, the shape of the lens surface r3 at the object side of the second group lens L2a is substantially In the distance measuring apparatus M' of the present embodiment, as in the first embodiment, to prevent the deterioration of the range finding accuracy, the direction of the decentration of the lens surfaces is identical among two optical systems. It should be noted however that, in this embodiment, the decentration between two lens surfaces of different independent lenses is considered, rather than the decentration between the lens surface at the object side and the lens surface at the image capturing area side of a single piece of lens.

As shown in FIG. 15, the first group lens L1a has an optical axis Aa which passes through the vertex of the lens surface r1 and the vertex of the lens surface r2 and which is perpendicular to the image capturing area Na. The optical axis Aa also passes through the center of the stop Sa. The second group lens L2a has an optical axis Ca which passes through the vertex of the lens surface r3 and the vertex of the lens surface r4 and which is perpendicular to the image capturing area Na. Likewise, the first group lens L1b has an optical axis Ab which passes through the vertex of the lens surface r1 and the vertex of the lens surface r2 and which is perpendicular to the image capturing area Nb. The optical axis Ab also passes through the center of the stop Sb. The second group lens L2b has an optical axis Cb which passes through the vertex of the lens surface r3 and the vertex of the lens surface r4 and which is perpendicular to the image capturing area Nb.

As shown in FIG. 15, the optical axis Aa of the first group lens L1a is not coincident with the optical axis Ca of the second group lens L2a, so that there is a decentration between these lens surfaces. This is because the center of an insertion section of the lens barrel H1a in which the second group lens L2a is to be held and the center of another insertion section of the lens barrel H1a in which the first group lens L1a is to be held are misaligned with each other due to, for example, mold errors in the lens barrel H1a. For the same reason, the optical axis Ab of the first group lens L1b is not coincident with the optical axis Cb of the second group lens L2b, so that there is a decentration between these lens surfaces. As described above, there is no decentration between the opposite lens surfaces of the first group lens L1a, L1b, and there is no decentration between the opposite lens surfaces of the second group lens L2a, L2b. Thus, it can be said that these decentrations are the decentration between the first group lens L1a and the second group lens L2a and the decentration between the first group lens L1b and the second group lens L2b.

Figure 17:
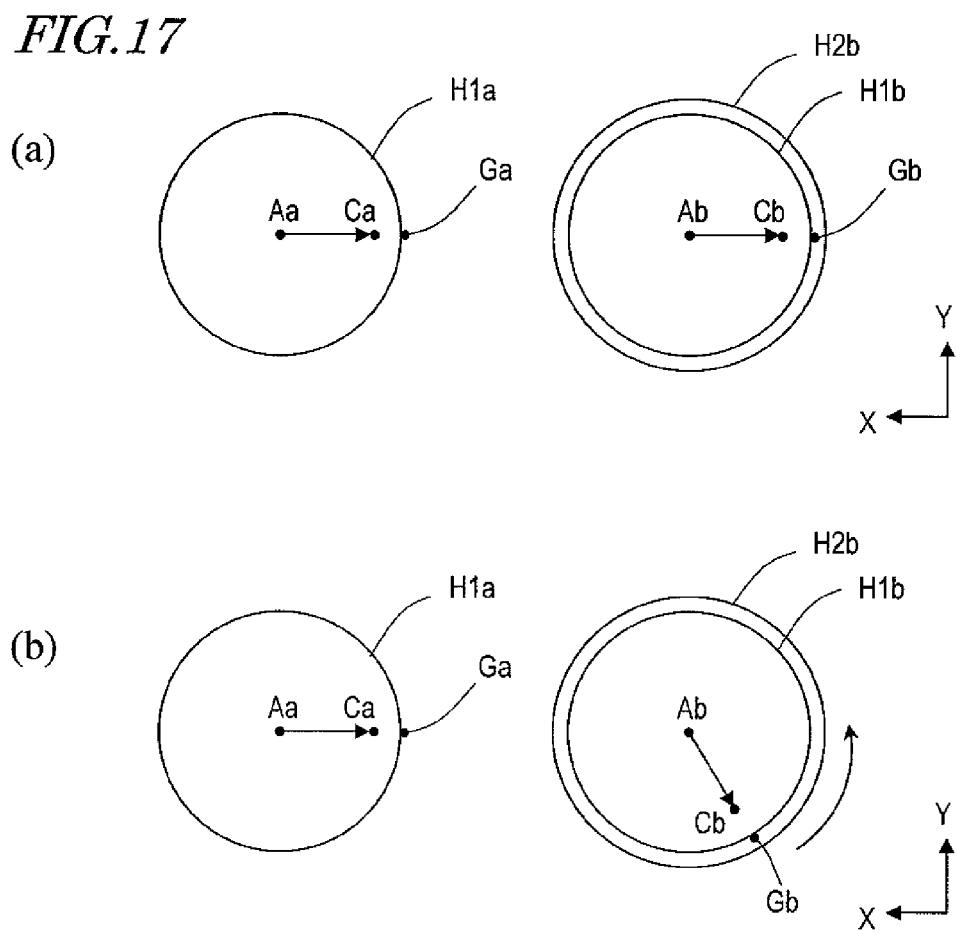
FIGS. 17(a) and 17(b) are diagrams which illustrate the direction of the decentration between lens surfaces in two optical systems of the second embodiment.

FIG. 17(a) illustrates the decentration between the optical axis of the first group lens L1a and the optical axis of the second group lens L2a, and the decentration between the optical axis of the first group lens L1b and the optical axis of the second group lens L2b. In the present embodiment, "decentration" means a misalignment between the optical axis of the first group lens and the optical axis of the second group lens. The direction of decentration is expressed by a vector originating from one of the optical axes and extending to the other optical axis in a plane perpendicular to the optical axes. For example, considering a vector originating from the optical axis of the first group lens, the directions of decentration are expressed by a vector extending from Aa to Ca and a vector extending from Ab to Cb as shown in FIG. 17(a).

As shown in FIG. 17(a), in the two optical systems, specifically in the lens barrels H1a and H1b, the direction of a vector extending from the optical axis Aa to the optical axis Ca and the direction of a vector extending from the optical axis Ab to the optical axis cb are identical. Here, "identical" refers not only to a case where the angle formed by the two vectors is 0° but also to a case where the angle formed by the two vectors is not more than 15°.

In the case of the present embodiment, the optical axes Ca and Cb have a decentration of −20 μm in the X direction relative to the optical axes Aa and Ab, respectively. However, the decentration directions are identical. These decentrations are attributed to a misalignment between the center of an insertion section in which the second group lens is to be held and the center of another insertion section in which the first group lens is to be held in each of the lens barrels H1a and H1b.

Thus, to make the direction of the decentration identical among the lens barrels H1a and H1b, it is preferred that the lens barrels H1a and H1b are manufactured by injection molding using the same mold. With the thus-manufactured lens barrels, the decentration directions of the lenses are made identical with the utilization of the gate marks of the lens barrels H1a and H1b.

Hereinafter, a method of manufacturing the distance measuring apparatus M' of the present embodiment, particularly a process of fabricating optical systems, is described.

(1) First, as described above, the first group lenses L1a and L1b, the second group lenses L2a and L2b, and the lens barrels H1a and H1b are manufactured by injection molding. As described above, the first group lenses L1a, L1b and the second group lenses L2a, L2b may be manufactured by injection molding, or may be manufactured by grinding, so long as a decentration does not occur between a pair of lens surfaces.

(2) Then, the first group lens L1a and the second group lens L2a are attached to the lens barrel H1a.

(3) Likewise, the first group lens L1b and the second group lens L2b are attached to the lens barrel H1b. Since there is no decentration between the pair of lens surfaces in each of the first group lenses L1a, L1b and the second group lenses L2a, L2b, the direction of attachment of the first group lenses L1a, L1b and the second group lenses L2a, L2b to the lens barrels H1a, H1b is not limited to any particular direction.

(4) Then, the lens barrel H1a is rotated for focus adjustment. Hereinafter, for the convenience of description, it is assumed that the orientation of a gate mark Ga after the focus adjustment is coincident with the −X direction as shown in FIG. 15. After the focus adjustment, the lens barrel H1a is fixed to the holding member K. For example, the adhesive agent T2 is cured.

(5) The lens barrel H1b is rotated for focus adjustment while holding the auxiliary lens barrel H2b so as not to rotate.

(6) If the azimuth of a gate mark Gb is generally coincident with the −X direction as is the orientation of the gate mark Ga of the lens barrel H1a at the time of completion of the focus adjustment of the lens barrel H1b, the lens barrel H1b is fixed to the auxiliary lens barrel H2b, and the auxiliary lens barrel H2b is fixed to the holding member K. For example, the adhesive agents T2, T3 are cured. If the azimuth of the gate mark Gb deviates from the −X direction as illustrated in FIG. 17(b), the auxiliary lens barrel H2b is rotated together with the lens barrel H1b in the direction indicated by the arrow such that the azimuth of the gate mark Gb of the lens barrel H1b is generally coincident with the −X direction as shown in FIG. 17(a). Thereafter, by curing the adhesive agents T2, T3, the lens barrel H1b is fixed to the auxiliary lens barrel H2b, and the auxiliary lens barrel H2b is fixed to the holding member K. In this way, by combination of the lens barrel H1b and the auxiliary lens barrel H2b, the orientation of the gate mark Gb can be changed while the focus position is maintained.

By thus rotating the auxiliary lens barrel H2b such that the orientation of the gate mark Gb of the auxiliary lens barrel H2b relative to the optical axis of the lens is coincident with the orientation of the gate mark of an auxiliary lens barrel H2a, the decentration directions between the optical axis of the first group lens and the optical axis of the second group lens in the lens barrel H1a and the lens barrel H1b, i.e., the direction of the vector extending from Aa to Ca and the direction of the vector extending from Ab to Cb, become identical as shown in FIG. 17(a).

When the mold of the lens barrel H1a and the lens barrel H1b is capable of molding a plurality of pieces of lens barrels at one time, the lens barrel H1a and the lens barrel H1b may be molded using the same cavity of the same mold, and the lens barrel H1a and the lens barrel H1b may be arranged such that the gate marks Ga, Gb are relatively oriented in generally identical directions. In the example described herein, the gate marks are used as alignment marks. However, alternatively, any other predetermined marks may be formed in the lens barrels H1a, H1b and used as alignment marks.

In the above example of the present embodiment, it is assumed that there is no decentration between the lens surfaces of each lens. However, even when the lens itself has a decentration as in the first embodiment, the distance measuring apparatus of the present embodiment is capable of preventing the deterioration of the range finding accuracy due to the decentration of the lens and the decentration between the lenses which is attributed to the lens barrels. In this case, the azimuths of the first group lenses L1a, L1b and the second group lenses L2a, L2b relative to the lens barrels H1a, H1b are made identical such that the direction of the decentration is identical among the lens barrels H1a and H1b.

To this end, it is preferred that the first group lenses L1a and L1b are manufactured by injection molding using the same mold. Also, it is preferred that the second group lenses L2a and L2b are manufactured by injection molding using the same mold. It is also preferred that the lens barrels H1a and Rib are manufactured by injection molding using the same mold. With the thus-manufactured lenses and lens barrels, the azimuths of the lenses are modified to be in a single direction with the utilization of the gate marks as previously described in the first embodiment.

Hereinafter, a method of manufacturing the distance measuring apparatus M', particularly a process of fabricating optical systems, in the case where a lens itself has a decentration is described.

(1') First, as described above, the first group lenses L1a and L1b, the second group lenses L2a and L2b, and the lens barrels H1a and H1b are manufactured by injection molding.

(2') Then, the first group lens L1a and the second group lens L2a are attached to the lens barrel H1a.

(3') Likewise, the first group lens L1b and the second group lens L2b are attached to the lens barrel H1b. In this step, the lenses are oriented such that the azimuth of the gate mark of the lens barrel H1b, the azimuth of the gate mark of the first group lens L1b, and the azimuth of the gate mark of the second group lens L2b relative to the optical axis (central axis) of the lens barrel H1b are respectively identical with the azimuth of the gate mark of the lens barrel H1a, the azimuth of the gate mark of the first group lens L1a, and the azimuth of the gate mark of the second group lens L2a relative to the optical axis (central axis) of the lens barrel H1a.

(4') Then, the lens barrel H1a is rotated for focus adjustment. Hereinafter, for the convenience of description, it is assumed that the orientation of the gate mark Ga after the focus adjustment is coincident with the −X direction as shown in FIG. 15. After the focus adjustment, the lens barrel H1a is fixed to the holding member K. For example, the adhesive agent T2 is cured.

(5') The lens barrel H1b is rotated for focus adjustment while holding the auxiliary lens barrel H2b so as not to rotate.

(6') If the azimuth of the gate mark Gb is generally coincident with the −X direction as is the orientation of the gate mark Ga of the lens barrel H1a at the time of completion of the focus adjustment of the lens barrel H1b, the lens barrel H1b is fixed to the auxiliary lens barrel H2b, and the auxiliary lens barrel H2b is fixed to the holding member K. For example, the adhesive agents T2, T3 are cured. If the azimuth of the gate mark Gb deviates from the −X direction as illustrated in FIG. 17(b), the auxiliary lens barrel H2b is rotated together with the lens barrel H1b in the direction indicated by the arrow such that the azimuth of the gate mark Gb of the lens barrel H1b is generally coincident with the −X direction as shown in FIG. 17(a). Thereafter, by curing the adhesive agents T2, T3, the lens barrel H1b is fixed to the auxiliary lens barrel H2b, and the auxiliary lens barrel H2b is fixed to the holding member K. In this way, by combination of the lens barrel H1b and the auxiliary lens barrel H2b, the orientation of the gate mark Gb can be changed while the focus position is maintained.

As described above, the azimuths of the first group lenses L1a, L1b and the second group lenses L2a, L2b relative to the lens barrel H1a and the lens barrel H1b are made identical with the utilization of gate marks. Therefore, by rotating the auxiliary lens barrel H2b such that the orientation of the gate mark Gb of the auxiliary lens barrel H2b is coincident with the position of the gate mark of the auxiliary lens barrel H2a, the azimuths of the first group lenses L1a, L1b relative to the optical axis of the lens barrel H1b become identical, and the azimuths of the second group lenses L2a, L2b relative to the optical axis of the lens barrel H1b also become identical. Thus, as shown in FIG. 17(a), the directions of the decentration between the lens surface r1 and the lens surface r4, i.e., the direction of the vector extending from Aa to Ca and the direction of the vector extending from Ab to Cb, are identical.

Note that the above also applies to the stop Sa and the stop Sb. If the openings of the stop Sa and the stop Sb have a decentration relative to the centers of their circumferences, it is preferred that the decentration directions of the stop Sa and the stop Sb are made identical.

Next, the simulation results of the range finding accuracy according to the present embodiment are described. The positional relationship between the plane chart T and the distance measuring apparatus M, the image size, and the simulation method are the same as those of the first embodiment. Note that the base line length B is 16 mm.

Figure 18:
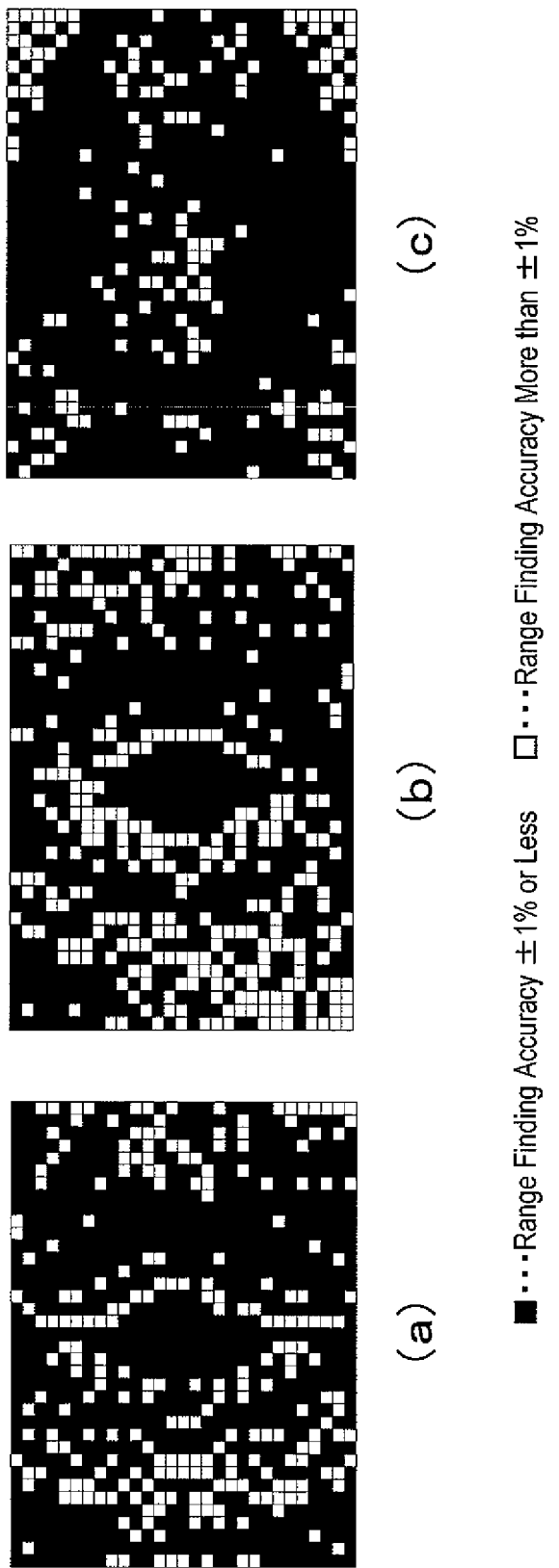
FIGS. 18(a) and 18(b) show the results of the range finding accuracy simulation of the second embodiment.
FIG. 18(c) shows the result of the range finding accuracy simulation in the case of no lens decentration.

FIG. 18(a) shows a range finding accuracy map in the case where both the second group lenses L2a, L2b have a deviation of −20 μm in the X direction as in FIG. 12(a). The direction of the decentration between the lens surface r1 and the lens surface r4 is completely identical among the lens barrel H1a and the lens barrel H1b (angle difference 0°). FIG. 18(b) shows a range finding accuracy map in the case where the direction of the decentration between the lens surface r1 and the lens surface r4 is different between the lens barrel H1a and the lens barrel H1b by an angle difference of 15°. FIG. 18(c) shows a range finding accuracy map in the case where the second group lenses L2a, L2b have no deviation, so that there is no decentration.

As clearly seen from the comparison of FIG. 18(c) with FIGS. 18(a) and 18(b), even when both the second group lenses L2a, L2b have a decentration, the deterioration of the range finding accuracy is fairly small, as compared with the case where there is no decentration, so long as the decentration directions are identical or the angle difference between the decentration directions is about 15°. Therefore, when the decentration directions are generally equal in the range of 15° or less, substantial deterioration of the range finding accuracy would not occur.

Figure 19:
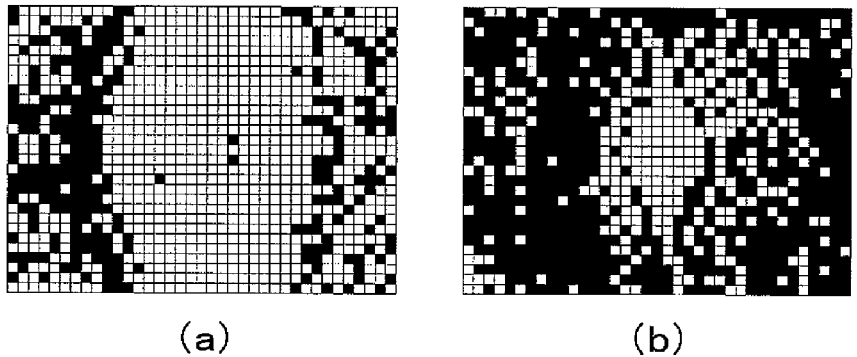
FIGS. 19(a) and 19(b) show the results of the range finding accuracy simulation of comparative examples.

FIG. 19(a) is a range finding accuracy map in the case where the second group lens L2b has a decentration of +20 μm in the X direction as opposed to FIG. 18(a), i.e., the direction of the decentration between the lens surface r1 and the lens surface r4 is different between the lens barrel H1a and the lens barrel H1b by 180°. FIG. 19(b) is a range finding accuracy map in the case where the second group lens L2b has a decentration of +20 μm in the Y direction (and a decentration of 0 μm in the X direction), i.e., the direction of the decentration between the lens surface r1 and the lens surface r4 is different between the lens barrel H1a and the lens barrel H1b by 90°.

As clearly seen from the comparison of FIGS. 19(a) and 19(b) with FIGS. 18(a) and 18(b), when the decentration direction is different by 90° or 180°, the range finding accuracy significantly deteriorates.

Thus, according to the present invention, even when there is a decentration between two lens surfaces, the direction of the decentration is identical among at least two of a plurality of optical systems, so that the deterioration of the range finding accuracy can be reduced, and the distance measurement can be realized with high accuracy.

In the first embodiment, the decentration which is to be considered in a plurality of optical systems is a decentration which occurs between the two lens surfaces at the object side and the image capturing area side of a single piece of lens. In the second embodiment, a decentration between lens surfaces of two adjacent lenses has been considered. The decentrations which are considered in the present invention in order to prevent the deterioration of the range finding accuracy are not limited to these deteriorations. For example, in the case where a plurality of optical systems include n lens surfaces, the direction of the decentration between the $i^{th}$ lens surface and the $j^{th}$ lens surface (counting from the object side) is made identical among at least one pair of the plurality of optical systems, whereby the deterioration of the range finding accuracy due to the decentration can be prevented. Here, n is an integer not less than 2, and i and j are different integers each of which is not less than 1 and not more than n.

Figure 20:
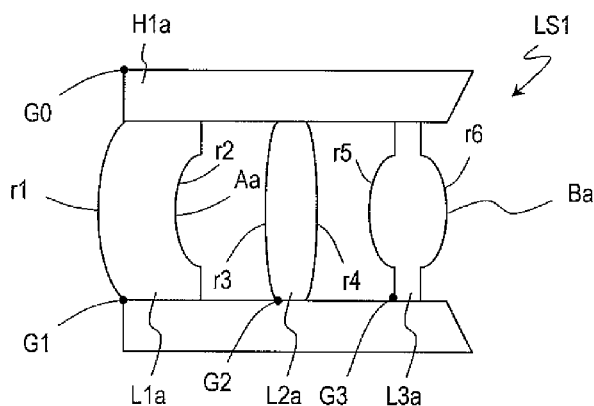
FIG. 20 is a diagram for illustration of the decentration of lens surfaces to which the present invention is applicable.

FIG. 20 schematically shows the structure of an optical system LS1 which is one of a plurality of optical systems of a distance measuring apparatus. For example, the optical system LS1 includes a lens L1a, a lens L2a, and a lens L3a. The lens L1a has a lens surface r1 at the object side and a lens surface r2 at the image capturing area side. The lens L2a has a lens surface r3 at the object side and a lens surface r4 at the image capturing area side. The lens L3a has a lens surface r5 at the object side and a lens surface r6 at the image capturing area side. In this case, the deterioration of the range finding accuracy which is caused by a decentration between any two of the lens surfaces r1 to r6 can be prevented by making the direction of the decentration identical among the plurality of optical systems. For example, the effect of the decentration on the range finding accuracy may be reduced by making the direction of the decentration between the optical axis Aa of the lens surface r2 of the lens L1a and the optical axis Ba of the lens surface r6 of the lens L3a identical among the plurality of optical systems.

The two lens surfaces which are to be selected may be selected from, for example, a lens which has a small radius of curvature. Because a lens which has a small radius of curvature greatly affects the deterioration of the range finding accuracy. Therefore, in each of the optical systems, one of the $i^{th}$ lens surface and the $j^{th}$ lens surface of which the decentration direction is to be made identical may preferably be a lens surface which has the smallest radius of curvature, excluding a flat lens surface (radius of curvature=0). More preferably, the $i^{th}$ lens surface and the $j^{th}$ lens surface may be a lens surface which has the smallest radius of curvature and a lens surface which has the second smallest radius of curvature.

In this case, as described above, the lens L1a, the lens L2a and the lens L3a are preferably fixed to the lens barrel H1a using the gate marks G0, G1, G2 and G3 as alignment marks such that the azimuths of the lens L1a, the lens L2a and the lens L3a relative to the optical axis of the lens barrel H1a are identical among the plurality of optical systems.

In this case, if there is not a large decentration between the lens surface r3 and the lens surface r4 of the lens L2a, the lens L2a may not be manufactured by injection molding, and the azimuth of the lens L2a may not be identical among a plurality of lenses.

INDUSTRIAL APPLICABILITY

A distance measuring apparatus according to the present invention can be used effectively in various applications including cars, surveillance cameras, stereoscopic shape measuring systems and so on.

REFERENCE SIGNS LIST

M distance measuring apparatus
Sa, Sb stop
La, Lb simple lens
L1a, L1b first group lens
L2a, L2b second group lens
Fa, Fb filter
Na, Nb image capturing plane
B base line length
r1, r2, r3, r4 lens surface

The invention claimed is:

1. A distance measuring apparatus for determining a distance to an object, comprising:
   a plurality of optical systems for forming images of the object; and
   an image capturing section having a plurality of image capturing areas which are associated with the plurality of optical systems on a one-to-one basis, the image capturing section being configured to convert images of the object formed in respective ones of the image capturing areas through the plurality of optical systems to electric signals, the distance to the object being determined based on a parallax between the images of the object formed through the plurality of optical systems,
   wherein each of the plurality of optical systems includes n lens surfaces, where n is an integer not less than 2,
   a direction of a decentration is identical among at least one pair of the plurality of optical systems, and
   the direction of the decentration is expressed by a vector which originates from a central axis that passes through a center of a vertex of an $i^{th}$ lens surface of one lens and which extends to a central axis that passes through a center of a vertex of a $j^{th}$ lens surface of the one lens (counting from the object side), where i and j are different integers each of which is not less than 1 and not more than n.

2. The distance measuring apparatus of claim 1, wherein each of the at least one pair of optical systems includes at least one lens which is formed by injection molding and which has a gate mark,
   the at least one lens has the $i^{th}$ lens surface and the $j^{th}$ lens surface, and
   the azimuth of the gate mark relative to a center of the at least one lens is identical among the at least one pair of optical systems.

3. The distance measuring apparatus of claim 1, wherein each of the at least one pair of optical systems includes one lens, and
   the one lens has the $i^{th}$ lens surface and the $j^{th}$ lens surface.

4. The distance measuring apparatus of claim 1, wherein each of the at least one pair of optical systems includes a first lens and a second lens, and the first lens and the second lens have the $i^{th}$ lens surface and the $j^{th}$ lens surface, respectively.

5. The distance measuring apparatus of claim 2, wherein each of the plurality of optical systems includes a lens barrel, the apparatus further comprises
an auxiliary lens barrel for supporting the lens barrel of one of the pair of optical systems, and
a holding member for holding the lens barrel of the other of the pair of optical systems and the auxiliary lens barrel in a predetermined spatial arrangement relative to the image capturing section,
the lens barrel of the other of the pair of optical systems and the holding member have a screw structure for a fitting engagement therebetween, and the lens barrel of the one of the pair of optical systems and the auxiliary lens barrel have a screw structure for a fitting engagement therebetween, and
the auxiliary lens barrel is rotatably supported by the holding member.

6. A method of manufacturing a distance measuring apparatus which includes a plurality of optical systems, comprising the steps of:
providing a plurality of lenses formed by injection molding using the same mold; and
arranging the plurality of lenses in a plurality of lens barrels for the optical systems such that a direction of a decentration is identical among at least one pair of the plurality of optical systems,
wherein the direction of the decentration is expressed by a vector which originates from a central axis that passes through a center of a vertex of one of the lens surfaces of one lens and which extends to a central axis that passes through a center of a vertex of the other lens surface of the one lens.

7. The method of claim 6, wherein the step of arranging the plurality of lenses includes arranging the lenses such that azimuths of gate marks of the lenses relative to the optical axes of the lenses are identical among lens barrels of the at least one pair of optical systems.

8. A method of manufacturing a distance measuring apparatus which includes a plurality of optical systems and an image capturing section, the image capturing section having a plurality of image capturing areas which are associated with the plurality of optical systems on a one-to-one basis, the method comprising the steps of:

(A) providing at least one pair of lens barrels which are formed by injection molding using the same mold;
(B) arranging at least two types of lenses in the pair of lens barrels to prepare at least one pair of the plurality of optical systems;
(C) adjusting a position of one of the one pair of optical systems such that an image of an object is focused on one of the plurality of imaging areas;
(D) adjusting a position of the other of the one pair of optical systems such that another image of the object is focused on another one of the plurality of imaging areas; and
(E) making a direction of a decentration identical among the one pair of optical systems,
wherein the direction of the decentration is expressed by a vector which originates from a central axis that passes through a center of a vertex of one of the lens surfaces of one lens and which extends to a central axis that passes through a center of a vertex of the other lens surface of the one lens.

9. The method of claim 8, wherein step (E) includes rotating the lens barrel of at least one of the one pair of optical systems relative to an optical axis of the optical system such that azimuths of gate marks of the lens barrels relative to the optical axes of the optical systems are identical among the one pair of optical systems.

10. The method of claim 9, wherein
among the two types of lenses in the one pair of lens barrels, lenses of the same type are formed by injection molding using the same mold, and
step (B) includes arranging the two types of lenses such that azimuths of gate marks of the two types of lenses relative to the gate marks of the lens barrels of the one pair of optical systems are identical among the one pair of optical systems.

11. The distance measuring apparatus of claim 1, wherein the plurality of optical systems are composed of independent lenses from each other.

12. The method of claim 6, wherein
the plurality of optical systems are composed of independent lenses from each other.

13. The method of claim 8, wherein
the plurality of optical systems are composed of independent lenses from each other.

* * * * *